US012785375B2

(12) United States Patent
Peri et al.

(10) Patent No.: US 12,785,375 B2
(45) Date of Patent: Nov. 3, 2026

(54) CIRCUIT BREAKER AND METHOD

(71) Applicant: Solaredge Technologies Ltd., Herzeliya (IL)

(72) Inventors: Amir Peri, Kochav Yair (IL); Tom Di Cori, Tel Aviv (IL)

(73) Assignee: Solaredge Technologies Ltd., Herzeliya (IL)

( * ) Notice: Subject to any disclaimer, the term of this patent is extended or adjusted under 35 U.S.C. 154(b) by 226 days.

(21) Appl. No.: 18/644,282

(22) Filed: Apr. 24, 2024

(65) Prior Publication Data

US 2024/0380196 A1 Nov. 14, 2024

Related U.S. Application Data

(60) Provisional application No. 63/500,663, filed on May 8, 2023.

(51) Int. Cl.
*H02H 1/00* (2006.01)
*H02H 3/00* (2006.01)
*H02H 3/08* (2006.01)

(52) U.S. Cl.
CPC ........ *H02H 1/0007* (2013.01); *H02H 1/0061* (2013.01); *H02H 3/006* (2013.01); *H02H 3/08* (2013.01)

(58) Field of Classification Search
CPC .. H02H 1/00; H02H 3/00; H02H 3/08; H02H 1/0007; H02H 1/0061; H02H 3/006; H02H 3/083
USPC ........................................................ 361/93.1
See application file for complete search history.

(56) References Cited

U.S. PATENT DOCUMENTS 9,787,080 B2 10/2017 Luebke et al.
11,552,500 B2 1/2023 Rao et al.
11,831,143 B1 * 11/2023 Krause ............... H01R 13/6683
2006/0190140 A1 * 8/2006 Soni .......................... H02J 3/14 700/297
2016/0294179 A1 10/2016 Kennedy et al.
2017/0125984 A1 * 5/2017 Mergener ............ H02J 13/1335
2018/0366885 A1 * 12/2018 Hewitt ................... H01R 27/02
2020/0176968 A1 * 6/2020 Ling ...................... H02H 3/033
2022/0216728 A1 7/2022 Ashman et al.
2023/0093980 A1 * 3/2023 Lebeau .................. H02J 3/007 307/9.1

OTHER PUBLICATIONS

Nov. 13, 2024—European Search Report—EP App No. 24174364.0.

* cited by examiner

*Primary Examiner* — Danny Nguyen
(74) *Attorney, Agent, or Firm* — Banner & Witcoff, Ltd.

(57) ABSTRACT

Systems, apparatuses, and methods are described for a circuit breaker. In some examples, control circuitry may be configured to receive sensor data related to a measured current through a first circuit breaker, determine available current based on the received measurement and a maximum current rating, and set a current trip value for the second circuit breaker according to the determined available current. In some examples, control circuitry may be configured to determine a direction of current, control the circuit breaker based on a first threshold when the current is in a first direction, and control the circuit breaker based on a second threshold when the current is in a second direction.

20 Claims, 10 Drawing Sheets

CIRCUIT BREAKER AND METHOD

CROSS-REFERENCE TO RELATED APPLICATIONS

This application claims the benefit of and priority to U.S. provisional application No. 63/500,663, filed May 8, 2023, the contents of which are incorporated herein by reference in their entirety.

BACKGROUND

A circuit breaker is an electrical safety device that may be arranged to protect elements of an electric circuit from damage. For example, elements of an electric circuit may be wiring of an electric power system. An overcurrent condition, also referred to as an excess current condition, is when a relatively large electric current exists through a conductor (such as the current exceeding the current rating of wiring of the electric circuit). An overcurrent condition may lead to the generation of an excessive amount of heat and/or the risk of fire. Some causes for an overcurrent condition may include a short circuit, an excessive load, an incorrect design, an arc fault, a ground fault, etc. A circuit breaker may be used as an overcurrent protection mechanism to prevent damage caused by an overcurrent condition. The circuit breaker may be arranged to open the electric circuit to interrupt current flow in order to protect elements of the electric circuit and to prevent the risk of fire. After the circuit breaker opens the circuit and the cause of the overcurrent condition is corrected, the circuit breaker may be reset to close the electric circuit and resume normal operation.

SUMMARY

The following summary is not an extensive overview and is not intended to identify key or critical elements or to otherwise limit the disclosure as described herein.

Systems, apparatuses, and methods are described for a circuit breaker with a protection threshold that is set dynamically. Systems, apparatuses, and methods are described for a bidirectional circuit breaker with an asymmetrical threshold (between current flow in one direction versus the current flow in the other direction). Systems, apparatuses, and methods are described for a circuit breaker with bidirectional asymmetry in current trip thresholds, and where the trip thresholds in each direction are set dynamically.

In some examples, the circuit breaker may include control circuitry that controls the flow of current, through one or more switches of the circuit breaker, bi-directionally (e.g., in a first direction from the controlled circuit breaker to a main circuit breaker, and in a second direction from the main circuit breaker to the controlled circuit breaker). In some examples, the circuit breaker may include control circuitry that controls the flow of current, through one or more switches of the circuit breaker, asymmetrically (e.g., depending on the direction of the current). The control circuitry may include a processor configured with software or computer instructions to operate the control circuitry to trip the circuit breaker according to the determined thresholds, or time to trip graphs.

In some examples, control circuitry may be configured to receive sensor data related to current through a main circuit breaker and/or a controlled circuit breaker, and to determine available current based on the received sensor data and a current rating. The current rating may be a threshold value or a range of values. The range of values may be a trip curve.

The control circuitry may be configured to set a current trip value for the controlled circuit breaker based on the determined available current. The current trip value may be a threshold value or a range of values. The range of values may be a trip curve. Examples of trip curves are shown in FIG. 8, FIG. 9, and FIG. 10, and are described in greater detail below.

In some examples, control circuitry may be configured to determine a direction of current, and control switching circuitry of the controlled circuit breaker based on a first threshold when the current is in a first direction, and control switching circuitry of the controlled circuit breaker based on a second threshold when the current is in a second direction.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

DETAILED DESCRIPTION

Figure 1:
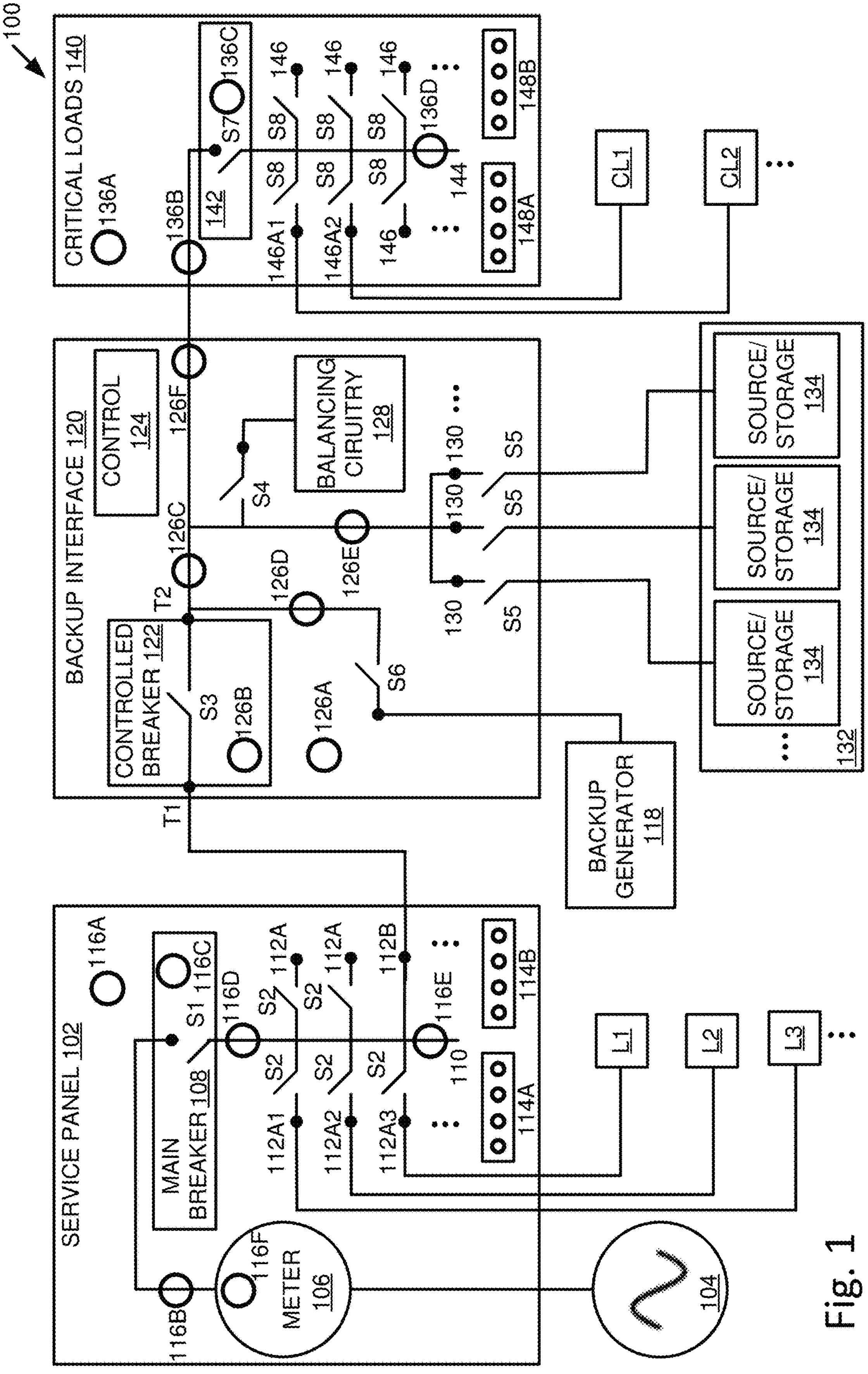
FIG. 1 shows an example power system in accordance with the present disclosure.

The accompanying drawings, which form a part hereof, show examples of the disclosure. It is to be understood that the examples shown in the drawings and/or discussed herein are non-exclusive and that there are other examples of how the disclosure may be practiced.

Systems, apparatuses, and methods are described herein for a circuit breaker.

In some examples, control circuitry of a controlled circuit breaker may be configured to receive sensor data. The sensor data may be based upon a measured first circuit breaker current (e.g., through a main circuit breaker). The control circuitry may be configured to determine an available current based on the received sensor data and a current rating. The current rating may be a threshold value or a range of values. The range of values may be a trip curve. The control circuitry may be configured to set a current trip value for a second circuit breaker (e.g., the controlled circuit breaker) based upon the determined available current. The control circuitry may be configured to trip the second circuit breaker according to the current trip value.

The first circuit breaker associated with the first circuit breaker current may be coupled to an electrical grid. For example, the first circuit breaker may be coupled to the electrical grid via a busbar of a service panel.

In some examples, a controlled circuit breaker may be configured to be coupled between a service panel and a backup interface panel. In some examples, the controlled circuit breaker may be coupled to or integrated with the backup interface panel. One or more sensors may be configured to measure a first electrical parameter measurement (e.g., a first current, a first power, etc.) in a first direction from the service panel to the backup interface panel via the switch. The one or more sensors may be configured to measure a second electrical parameter measurement (e.g., a second current, a second power, etc.) in a second direction from the backup interface panel to the service panel via the switch. Control circuitry may be configured to compare the first electrical parameter measurement to a first threshold, and compare the second electrical parameter measurement to a second threshold. Control circuitry may be configured to control switching circuitry, including one or more switches, to disconnect the service panel from the backup interface panel by opening the one or more switches. Control circuitry may be configured to control the one or more switches to disconnect the service panel from the backup interface panel based on: (i) the first electrical parameter measurement being greater than the first threshold, or (ii) the second electrical parameter measurement being greater than the second threshold. The first threshold may be different than the second threshold. The first threshold may be greater than the second threshold. The one or more sensors may include a first sensor and a second sensor that are integrated into a common sensor package. The common sensor package may be configured to determine a direction of an electrical parameter measurement. The one or more switches may be one or more electromechanical switches (e.g., one or more relays) and/or one or more electronic solid state switches (e.g., one or more transistors). The first threshold may be determined based on a rating of a busbar (e.g., a busbar of the service panel). The second threshold may be determined based on a rating of a main circuit breaker (e.g., a main circuit breaker of the service panel). In some examples, the first threshold and/or the second threshold may be adjusted. For example, the first threshold and/or the second threshold may be adjusted based on a determined available current.

In some examples, the control circuitry may be configured to determine an available current by calculating a total current and comparing the calculated total current to a threshold (e.g., a first threshold or a second threshold). The total current may be calculated based on a plurality of sensed currents related to a plurality of loads. The plurality of loads may include a first plurality of loads connected to the service panel and/or a second plurality of loads connected to a critical loads panel. The critical loads panel may be coupled to the backup interface panel. Which threshold, i.e., either the first threshold or the second threshold, which is used to determine the available current, may depend on a determined direction of the current.

In some examples, the control circuitry may be configured to determine an available power by calculating a total power and comparing the calculated total power to a threshold (e.g., a first threshold or a second threshold). The total power may be calculated based on a plurality of sensed powers related to a plurality of loads (e.g., a first plurality of loads connected to the service panel and/or a second plurality of loads connected to a critical loads panel).

In some examples, the control circuitry may be configured to control a current or a power to be below a third threshold, wherein the third threshold is less than the first threshold.

The control circuitry may be configured to set a first trip value based on the first threshold, and set a second trip value based on the second threshold. The control circuitry may be configured to control an adjustment of the first threshold value, the second threshold value, the first trip value, and/or the second trip value.

It is noted that the presently disclosed subject matter is provided by way of example and not limitation, and is not bound by the systems and apparatuses described with reference to the figures. Equivalent and/or modified functionality may be consolidated or divided in another manner and may be implemented in any appropriate combination. For example, elements which are shown as separate units may have their functionalities and/or components combined into a single unit, and vice-versa.

It is also noted that like references in the various figures may refer to like elements throughout the application. Similar reference numbers may also connote similarities between elements. Throughout the application certain general references may be used to refer to any of the specific related elements. For example, service panel sensors 116 may refer to sensor 116A, sensor 116B, sensor 116C, sensor 116D, sensor 116E, and/or sensor 116F.

It is also noted that all numerical values given in the examples of the description are provided for purposes of example and not limitation, and do not exclude the use of other numerical values for the same feature.

The terms “connect,” “connected,” and “connection” may refer to any appropriate electrical, mechanical, and/or communication connection used to couple two or more elements.

The terms “determine” and “compute” may refer to an action made, for example, by computer processing circuitry.

The terms “substantially” and “about” are used herein to indicate variations that are equivalent for an intended purpose or function (e.g., within a permissible variation range). Certain values or ranges of values are presented herein with numerical values being preceded by the terms “substantially” and “about”. The terms “substantially” and “about” are used herein to provide literal support for the exact number that it precedes, as well as a number that is near to or approximately the number that the term precedes. In determining whether a number is near to or approximately a specifically recited number, the near or approximating unrecited number may be a number, which, in the context in which it is presented, provides a substantial equivalent of the specifically recited number.

Control devices, including “controller,” “control circuitry,” “computer,” “processor,” “processing circuitry,” and variations of these terms as used herein, include any analog or digital electronic hardware circuit capable of performing one or more logical or arithmetic functions. The functions may be based on a received signal (e.g., from a sensor that measures a physical parameter as in the various example described herein). Performance of the functions may cause an output of a signal (e.g., to control another device such as a switch or to provide an indication as in the various examples described herein). Such control devices include, by way of non-limiting examples, a digital signal processor (DSP), microprocessor, microcontroller, field programmable gate array (FPGA), application-specific integrated circuit (ASIC), embedded controller, analog comparator, analog-to-digital controller, digital-to-analog controller, etc., or combinations thereof. Such control devices may include or be connected to a memory that stores instructions that may be read, interpreted and executed by the devices, and based on the executed instructions, perform any one of functions or control as described herein.

The terms "memory" "computer memory" or "data storage device" used herein include any volatile or non-volatile computer memory suitable to the presently disclosed subject matter (e.g., random-access memory [RAM], static random-access memory [SRAM], read-only memory [ROM], erasable programmable read-only memory [EPROM], electrically erasable programmable read-only memory [EEPROM], dynamic random-access memory [DRAM], etc.). The above may include any of the control circuitry disclosed herein. More specifically, by way of non-limiting example, the above may include the control circuitry 124 disclosed in the present application. Control devices may be included and/or connected to interface hardware, that converts signals from other devices (e.g., sensors) to signals compatible with the control device (e.g., a comparator or analog to digital [A/D] converter that converts an analog signal to a digital signal), or that converts signals from the control device to signals compatible with another device (e.g., an amplifier for driving a control input of a switch). The control circuitry may be configured to output control signals to control an operational state (e.g., ON, OFF, opened, closed, etc.) of one or more switches.

The terms "switching circuitry" and "switch" used herein may refer to any appropriate switching element. Examples of a switch are (but not limited to): a transistor, a field effect transistor (FET), a metal oxide semiconductor field effect transistor (MOSFET), a bipolar junction transistor (BJT), an insulated-gate bipolar transistor (IGBT), a Silicon Carbide (SIC) switch, a Gallium Nitride (GaN) switch, a thyristor, a semiconductor controlled rectifier (SCR), a solid state relay (SSR), electromechanical relays, AC relays, throw switches, etc. The switch may be single throw, double throw, etc. A switch may be controlled into different states (e.g., ON, OFF) via a control input (e.g., gate, base, coil terminals) connected to a signal generated from a control device (e.g., based on performing one or more functions).

Reference is now made to FIG. 1, which shows an example power system 100.

Power system 100 may include a service panel 102. Service panel 102 may be connected to an electrical grid 104. Service panel 102 may include a meter 106 connected to the electrical grid 104. Meter 106 may be arranged to measure an electrical parameter measurement (e.g., current, voltage, power, etc.). The electrical parameter measurement may be indicative of electrical current supplied from the electrical grid 104 to the service panel 102. Service panel 102 may include a main circuit breaker 108 connected between the electrical grid 104 and a busbar 110 of the service panel 102. Main circuit breaker 108 may include switching circuitry including at least one switch S1. Switch S1 may be configured to connect the electrical grid 104 to the busbar 110 when switch S1 is in a closed state (for example, an ON state of switch S1), and to disconnect the electrical grid 104 from the busbar 110 when switch S1 is in an open state (for example, an OFF state of switch S1).

Busbar 110 may include a plurality of load terminals 112A. Load terminals 112A may be connected to busbar 110 via respective load switching circuitry. The load switching circuitry may include one or more switches S2. Load terminals 112A may be arranged to connect to respective loads. The loads may comprise any suitable number and/or type, and may operate in accordance with any suitable power consumption. For example, the loads may be appliances or devices such as, computers, televisions, lamps, power tools, welders, kilns, electric vehicle (EV) chargers, HVAC units (e.g. including ones with variable speed compressors and/or fans), battery units, etc. To provide additional examples, the loads may comprise swimming pools, spas, and/or any suitable components that may be utilized in conjunction with the operation and/or maintenance of swimming pools and/or spas, which may optionally comprise variable speed compressors and/or fans, such as heaters, chillers, chlorinators, cleaners, powered covers, pumps, etc. Thus, in some cases the loads may include one or more relatively high amperage loads.

Additionally or alternatively, the loads connected to busbar 110 may be considered non-critical loads L1, L2, L3, etc. Non-critical loads are loads that might not receive power when the main circuit breaker 108 is in an open state (e.g., switch S1 is in an OFF state) and busbar 110 of the service panel 102 is disconnected from the electrical grid 104. Non-critical loads may receive power from other power sources (for example, backup generator 118 or power source and/or storage 132, described in more detail below). Non-critical loads might not receive power when the controlled circuit breaker 122 is in an open state (e.g., switch S3 is in an OFF state) and busbar 110 of the service panel 102 is disconnected from the backup interface panel 120.

Service panel 102 may include a plurality of secondary branch switches S2 (for example, secondary circuit breakers). Each switch S2 may be connected between the busbar 110 and a respective load terminals 112A. For example, non-critical load L1 may be connected to busbar 110 via load terminal 112A3 and its respective switch S2, non-critical load L2 may be connected to busbar 110 via load terminal 112A2 and its respective switch S2, non-critical load L3 may be connected to busbar 110 via load terminal 112A1 and its respective switch S2, etc. One of the load terminals 112B may be directly connected to a backup interface panel 120. For example, backup interface panel 120 may be directly connected to busbar 110 via load terminal 112B. Load terminal 112B is also referred to herein as circuit breaker terminal 112B. Service panel 102 may also include a neutral busbar 114A and a ground busbar 114B.

Non-critical loads L1, L2, L3 may have load control circuitry. Non-critical loads L1, L2, L3 may have load communication circuitry. Load communication circuitry may include load transmitter circuitry and/or load receiver circuitry. Load transmitter circuitry may be configured to transmit communication signals (e.g., to control circuitry 124). Load transmitter circuitry may be configured to transmit communication signals using any suitable number and/or type of communication protocols. For example, the load communication circuitry may be configured as any suitable combination of hardware and/or software components to enable wired and/or wireless communication between the one or more (or all) of the non-critical loads and the control circuitry 124. Such wired communication protocols may comprise, for example, power-line communication (PLC) protocols. Wireless communication protocols may comprise, for example, a Short Range mobile radio communication standard such as e.g. Bluetooth, Zigbee, etc., a Medium or Wide Range mobile radio communication standard such as e.g. a 3G (e.g. Universal Mobile Telecommunications System-UMTS), a 4G (e.g. Long Term Evolution—LTE), or a 5G mobile radio communication standard in accordance with corresponding 3GPP (3rd Generation Partnership Project) standards. As a further example, wireless communications between the non-critical loads and the control circuitry 124 may comprise a Wireless Local Area Network communication protocol or standard such as e.g. in accordance with IEEE 802.11 (e.g. 802.11, 802.11a, 802.11b, 802.11g, 802.11n, 802.11p, 802.11-12, 802.11ac, 802.11ad, 802.11ah, 802.11ax, 802.11ay, etc.). The load receiver circuitry may be configured to receive wired and/or wireless communication signals in accordance with any suitable number and/or type of communication protocols, such as those described above with respect to the load transmitter circuitry, for instance.

As described above with respect to the non-critical loads L, the control circuitry 124, and/or the critical loads CL, which are discussed in further detail below, may also comprise communication circuitry such as transmitter circuitry and/or receiver circuitry. The communication circuitry may comprise any suitable combination of hardware and/or software components to enable the transmission and reception of communication signals between the respective components of the power system 100 using any suitable number and/or type of communication protocols.

Additionally or alternatively, one or more of the non-critical loads L, the control circuitry 124, and/or the critical loads CL may perform data communications with other components that may be external to the power system 100. Such data communications may use the same communication protocol or a different communication protocol than that used for communications with the critical and non-critical loads. For instance, the control circuitry 124 may be configured to transmit and/or receive data via a connection to the Internet or other suitable communication network, and use this connection to receive information from one or more connected Internet of Things (IoT) devices, one or more Internet-connected applications (e.g. alarm systems), one or more sensors that may be located proximate to (e.g. at the same premises as) the critical and/or the non-critical loads, etc. In any event, the data that is transmitted and received between the control circuitry 124, the non-critical loads L, and/or the critical loads CL may enable additional functionality with respect to the backup interface panel 120, as discussed in further detail below. Thus, the data that may be received by the control circuitry 124 as discussed herein to perform various functions may be collectively referred to herein as "sensor data," which may include data received from the sensors 116 or any other suitable source (e.g. those discussed above in this paragraph).

Loads (such as, non-critical loads L1, L2, L3 and critical loads CL1 CL2, described below) may have a load profile associated with each respective load. The load profile may be stored in computer memory associated with the load and/or computer memory associated with control circuitry 124. Control circuitry 124 may be configured to obtain one or more load profiles (e.g. via the data communications described above and/or using sensor data) and set a current trip value of a controlled circuit breaker based on the one or more load profiles.

Control circuitry 124 may be configured to receive and/or determine the one or more load profiles. Control circuitry 124 may be configured to receive part of a load profile and determine a different part of the load profile. For example, control circuitry 124 may be configured to receive a first part of a load profile and to determine a second, different part of the load profile based on the first received part of the load profile. The load profile may include current level data, power level data, time level data, priority data, load identification data, etc. Current level data may relate to a plurality of current levels that the load is configured to operate at (e.g., about 10 A, about 20 A, about 30 A, about 40 A, about 50 A, etc.). Power level data may relate to a plurality of power levels that the load is configured to operate at (e.g., about 15 W, about 30 W, about 45 W, about 60 W, etc.). Time level data may include a time that the load usually operates at (e.g., time of day, days of month, months of year, etc.), and/or an amount of time that the load usually operates (e.g., seconds, minutes, hours, days, months, years, etc.). Priority data may indicate that the load is a higher priority or lower priority load, and/or that the load is a non-critical or critical load. Load identification data may include information for identifying a particular load (for example, a serial number, assigned identification number, related load terminal 112A, 146, panel location, etc.). Control circuitry 124 may be configured to use the load profile data to control the controlled circuit breaker 124. Control circuitry 124 may use the load profile to determine an expected available current and to set a current trip value of the controlled circuit breaker 122. Control circuitry 124 may use the load profiles to manage loads of the power system 100 and help prevent an overcurrent situation in the power system (for example, help prevent the tripping of controlled circuit breaker 122). Controlled circuit breaker 122 may be configured to be used in extra-low voltage systems (e.g., about tens of volts), low voltage systems (e.g., about hundreds of volts), or high voltage systems (e.g., about thousands of volts). For example, according to international standard IEC 60038, for AC RMS voltage, high voltage may be about 1 kV to about 3.5 kV, low voltage may be about 50 V to about 1 kV, and extra-low voltage may be below about 50V.

Service panel 102 may include one or more service panel sensors 116. For example, sensor 116A may be located and incorporated in any appropriate arrangement in the service panel 102. Some examples of arrangements of the service panel sensors 116 are shown as: sensor 116B connected between the meter 106 and the main circuit breaker 108, sensor 116C located in the main circuit breaker 108, sensor 116D connected between the main circuit breaker 108 and the busbar 110, sensor 116E connected to a second end of the busbar 110, sensor 116F located in the meter 106, etc. Service panel sensors 116 may each be arranged to measure an electrical parameter measurement (e.g., current, voltage, power, etc.). The electrical parameter measurement obtained by service panel sensors 116 may be related to the service panel 102 (e.g., one or more elements of the service panel 102). For example, the electrical parameter measurement may be related to a current flowing through the main circuit breaker 108 and/or one or more of the switches S2.

Power system 100 may include a backup interface panel 120. Backup interface panel 120 may be arranged to be connected between service panel 102, a critical loads panel 140, a backup generator 118, and/or a power source and/or storage 132. Backup interface panel 120 may include control circuitry 124 configured to control a controlled circuit breaker 122 and manage the supply of power to and from the various elements connected to the backup interface panel 120. Backup interface panel 120 may be connected to the service panel 102 via the controlled circuit breaker 122. Controlled circuit breaker 122 may be connected directly to busbar 110 via load terminal 112B. Load terminal 112B may be arranged to connect the service panel 102 to the backup interface panel 120.

Controlled circuit breaker 122 may have a terminal T1 connected to load terminal 112B. Controlled circuit breaker 122 may include switching circuitry including at least one switch S3. Switch S3 may be connected between terminal T1 and a second terminal T2 of controlled circuit breaker 122. Switch S3 may be arranged to connect the busbar 110 of service panel 102 to the power source and/or storage 132 when switch S3 is in a closed state (for example, an ON state of switch S3). Switch S3 may also be arranged to connect the busbar 110 of service panel 102 to critical loads panel 140 connected to the backup interface panel 120 when switch S3 is in a closed state (for example, an ON state of switch S3). Switch S3 may be arranged to disconnect the service panel 102 from the backup interface panel 120 when switch S3 is in an open state (for example, an OFF state of switch S3). Backup interface panel 120 may include control circuitry 124 configured to control the controlled circuit breaker 122. Control circuitry 124 may be arranged to set current trip values of the switch S3 and control the switch S3 to turn OFF or ON. Switch S3 may include a plurality of current trip values. The current trip values may be thresholds or ranges of values. Switch S3 may include a plurality of switches. For example, switch S3 may include a plurality of switches connected to each other in series and/or in parallel. Some examples of operations of control circuitry 124 are provided in greater detail below.

In some examples, control circuitry 124 may be located internal to a housing of controlled circuit breaker 122 (for example, as shown in FIG. 1). In some examples, control circuitry 124 may be located external to a housing of controlled circuit breaker 122 (for example, shown in FIG. 2). In some examples, control circuitry 124 may be located external to a housing of backup interface panel 120.

Backup interface panel 120 may include one or more backup interface panel sensors 126. For example, sensor 126A may be located and incorporated in any appropriate arrangement in the backup interface panel 120. Some examples of arrangements of the backup interface panel sensors 126 are shown as: sensor 126B located in the controlled circuit breaker 122, sensor 126C connected between the controlled circuit breaker 122 and balancing circuitry 128, sensor 126D connected between the controlled circuit breaker 122 and backup generator 118, sensor 126E connected between the power source and/or storage 132, sensor 126F connected between the backup interface panel 120 and a critical loads panel 140 etc. Backup interface panel sensors 126 may each be arranged to measure an electrical parameter measurement (e.g., current, voltage, power, etc.). The electrical parameter measurement obtained by backup interface panel sensors 126 may be related to the backup interface panel 120 (e.g., one or more elements of the backup interface panel 120). For example, the electrical parameter measurement may be related to a current flowing through the controlled circuit breaker 122.

Power system 100 may include a backup generator 118. Backup generator 118 may be a power source. For example, backup generator 118 may include a diesel generator, propane generator, natural gas generator, photovoltaic (PV) generator, wind generator, etc. For example, backup generator 118 may include a flexible pool cover with a plurality of photovoltaic (PV) modules attached to it. Backup generator 118 may be arranged to provide power to one or more loads (for example, of critical loads panel 140 and/or service panel 102). For example, backup generator 118 may be configured to provide power when main circuit breaker 108 is in an open state (e.g., switch S1 is in an OFF state) and busbar 110 of the service panel 102 is disconnected from the electrical grid 104. Backup generator 118 may be connected to backup interface panel 120 via switch S6. For example, switch S6 may be connected to terminal T2 of controlled circuit breaker 122.

Backup interface panel 120 may include balancing circuitry 128. Balancing circuitry 128 may be circuitry configured to balance phase differences of alternating current (AC) and/or to balance power by performing power factor correction (PFC). For example, balancing circuitry 128 may be circuitry configured to remove an imaginary power component. Balancing circuitry 128 may be connected to controlled circuit breaker 122 via switch S4. For example, switch S4 may be connected to terminal T2 of controlled circuit breaker 122. In some examples, balancing circuitry 128 may be external to the housing of backup interface panel 120.

Backup interface panel 120 may include power source and/or storage terminals 130. Power source and/or storage terminals 130 may be connected to a power source and/or storage 132 via respective switches S5.

Power system 100 may include power source and/or storage 132. For example, power source and/or storage 132 may include a plurality of power sources and/or storages 134. Each power source and/or storage 134 may include an inverter and/or a battery. For example, each power source and/or storage 134 may be connected to a direct current (DC) power source. The DC power source may be a PV power source. For example, the DC power source may include a flexible pool cover as noted above with a plurality of PV modules attached to it.

Each power source and/or storage 134 may include a system power device, for example, one or more: DC to DC converters (e.g., buck converters, boost converters, buck/boost converters, buck+boost converters, etc.), DC to AC converters (also referred to as inverters), combiner and/or monitoring boxes, etc. The system power device may be an inverter for one or more phases (e.g., one phase inverter, two phase inverter, three phase inverter, etc.), or may include lines or phases that are not shown herein for the sake of simplicity. The system power device may be configured to convert an input power to an output power.

Each power source and/or storage 134 may include one or more PV modules, e.g. a plurality of PV modules (e.g. PV panels, cells, etc.) connected in series as a serial string of PV modules. Each PV module may include a plurality of PV cells, e.g. one or more serial strings of PV cells. One or more of the PV modules may be connected to one or more power devices between the PV module and the system power device to form a power module connected to the system power device. Each power device may include power converter circuitry. The power converter circuitry may include, for f example, one or more: buck converter circuitry, boost converter circuitry, buck/boost converter circuitry, buck+boost converter circuitry, flyback converter circuitry, etc. The power devices may be DC to DC converters. The power converter circuitry may be configured to convert an input power to an output power.

Power source and/or storage 132 may be connected to the controlled circuit breaker 122 via a plurality of switches S5. Power source and/or storage 132 may be arranged to generate current flowing through controlled circuit breaker 122, primary circuit breaker 142 of the critical loads panel 140, and/or the main circuit breaker 108 of the service panel 102.

Power source and/or storage 132 may be arranged to store power associated with current flowing through the main circuit breaker 108 and the controlled circuit breaker 122 (e.g., current provided from the electrical grid 104). Power source and/or storage 132 may be arranged to store power provided from the backup generator 118. Power source and/or storage 132 may be arranged to store power generated by power source and/or storage 132.

Power system 100 may include a critical loads panel 140. Critical loads panel 140 may be connected to the backup interface panel 120. A terminal of critical loads panel 140 may be directly connected to terminal T2 of controlled circuit breaker 122. Critical loads panel 140 may include a primary circuit breaker 142 connected between the backup interface panel 120 and a busbar 144 of the critical loads panel 140. Primary circuit breaker 142 may include switching circuitry including at least one switch S7. Primary circuit breaker 142 may be connected directly to backup interface panel 120 via a terminal of switch S7 that connects the critical loads panel 140 to the backup interface panel 120. Primary circuit breaker 142 may have a terminal connected to load terminal T2. Switch S7 may be connected between the terminal connected to load terminal T2 and a second terminal of primary circuit breaker 142. In some examples, control circuitry 124 may be configured to control primary circuit breaker 142 (for example, there may be a plurality of controlled circuit breakers, with a first controlled circuit breaker 122 in the backup interface panel 120 and a second controlled primary circuit breaker 142 in the critical loads panel 140). In some examples, main circuit breaker 108 may also be a controlled circuit breaker controlled by control circuitry 124. Switch S7 may be arranged to connect the busbar 144 of critical loads panel 140 to the backup interface panel 120 (for example, thereby connecting the busbar 144 of critical loads panel 140 to one or more power sources of power system 100). Switch S7 may be arranged to connect the busbar 144 of critical loads panel 140 to the backup interface panel 120 when switch S7 is in a closed state (for example, an ON state of switch S7), and to disconnect the critical loads panel 140 from the backup interface panel 120 when switch S7 is in an open state (for example, an OFF state of switch S7).

Busbar 144 may include a plurality of critical load terminals 146. Critical load terminals 146 may be connected to busbar 144 via respective critical load switching circuitry. The critical load switching circuitry may include one or more respective switches S8. Critical load terminals 146 may be arranged to connect to respective loads. For example, the loads may be appliances or devices that are arranged to receive power even when the main circuit breaker 108 is in an open state (e.g., switch S1 is in an OFF state) and busbar 110 of the service panel 102 is disconnected from the electrical grid 104. The appliances and devices may include: air conditioning, heaters, coolers, lamps, lighting, fridges, ovens, washers, dryers, computers, water pumps, etc. The critical loads CL may additionally or alternatively comprise any of appliances, devices, components, etc., which were identified above with respect to the non-critical loads. Thus, the critical loads CL may also include a plurality of relatively high amperage loads. However, the loads connected to busbar 144 may be considered critical loads, which are loads that may receive power when the main circuit breaker 108 is in an open state (e.g., switch S1 is in an OFF state) and busbar 110 of the service panel 102 is disconnected from the electrical grid 104. Critical loads may receive power from other power sources (for example, backup generator 118 or power source and/or storage 132). Critical loads may receive power when the controlled circuit breaker 122 is in an open state (e.g., switch S3 is in an OFF state), busbar 110 of the service panel 102 is disconnected from the backup interface panel 120, and busbar 144 of the critical loads panel 140 is connected to the backup interface panel 120. In some examples, controlled breaker 122 may be arranged to connect and disconnect backup generator 118 and/or or power source and/or storage 132 to and from the backup interface panel 120.

Critical loads panel 140 may include a plurality of secondary branch switches S8 (for example, secondary circuit breakers). Each switch S8 may be connected between the busbar 144 and a respective critical load terminal 146. For example, critical load CL1 may be connected to busbar 144 via critical load terminal 146A1 and its respective switch S8, critical load CL2 may be connected to busbar 144 via load terminal 146A2 and its respective switch S8, etc. Critical loads panel 140 may also include a neutral busbar 148A and a ground busbar 148B.

Critical loads panel 140 may include one or more critical loads panel sensors 136. For example sensor 136A may be located and incorporated in any appropriate arrangement in the critical loads panel 140. Some examples of arrangements of the sensors 136 are shown as: sensor 136B connected between the backup interface panel 120 and the primary circuit breaker 142, sensor 136C located in the primary circuit breaker 142, sensor 136D connected to an end of the busbar 144, etc. In some examples, a sensor may be connected between the primary breaker 142 and the busbar 144. Critical loads panel sensors 136 may each be arranged to measure an electrical parameter measurement (e.g., current, voltage, power, etc.). The electrical parameter measurement obtained by critical loads panel sensors 136 may be related to the critical loads panel 140 (e.g., one or more elements of the critical loads panel 140). For example, the electrical parameter measurement may be related to a current flowing through the primary circuit breaker 142 and/or one or more of the switches S8.

Sensors 116, 126, 136 may be configured to obtain sensor data. Control circuitry 124 may be connected to any and/or all of the plurality of sensors 116, 126, 136 of power system 100. Control circuitry 124 may be configured to receive sensor data from any and/or all of the plurality of sensors 116, 126, 136. The control circuitry 124 may be configured to receive the sensor data from the sensor 116, 126, 136 via wired and/or wireless communications using any suitable communication protocols, which may be one or more of those discussed above with respect to the data communications performed via the control circuitry 124, the non-critical loads L, and/or the critical loads CL. For example, the control circuitry 124 may be configured to receive the sensor data from the sensor 116, 126, 136 via power line communication (PLC). The sensor data may be based upon a measured electrical parameter measurement made by a respective sensor 116, 126, 136. The electrical parameter measurement may be related to a first circuit breaker current (e.g., a current related to main circuit breaker 108, controlled circuit breaker 122, and/or primary circuit breaker 142). The control circuitry 124 may be configured to determine an available current based on the sensor data and a current rating. The current rating may be a maximum current rating. For example, a maximum current rating may be a current value that represents an amount of current that should not be exceeded for a given element of the power system 100 (e.g., about 20 A, about 40 A, about 50 A, about 100 A, about 200 A, about 240 A, etc.). The control circuitry 124 may be configured to set a current trip value for a second circuit breaker (e.g., the controlled circuit breaker 122 and/or primary circuit breaker 142) based on the determined available current and a current rating. The current rating may be a determined current rating (e.g., determined based on a current rating) Determined current ratings are described in more detail below. For example, a current trip value may be a current value that represents an amount of measured current that may cause the circuit breaker to open the switching circuitry and "trip" the circuit breaker (e.g., turn the circuit breaker switch to an OFF state). The current trip value may be the same as or different than a current rating. In some examples, the current trip value may be equal to, greater than, or less than a current rating (e.g., about 15 A, about 35 A, about 40 A, about 90 A, about 190 A, about 230 A, etc.).

For example, the main circuit breaker 108 (which may be associated with the first circuit breaker current), the busbar 110, and load terminal 112B (also referred to herein as circuit breaker terminal 112B) may be rated for a first current rating (e.g., about 200 A). Each load terminal 112A may be rated for a second current rating (e.g., about 40 A). The first current rating may be different than the second current rating. The first current rating may be greater than the second current rating (e.g., about 200 A>about 40 A). In some examples, the busbar 110 may have a third current rating (e.g., about 240 A). The third current rating may be different than the first and second current ratings. The third current rating may be greater than the first and second current ratings (e.g., about 240 A>about 200 A>about 40 A). The current ratings may be thresholds or ranges of values.

The control circuitry 124 may be configured to determine a determined current rating used to set the current trip value based on a current rating of an element of the power system 100. For example, the determined current rating may be between about 5% to about 95% of a current rating of the element of the power system 100. For example, the control circuitry 124 may be configured to determine a determined current rating used to set the current trip value based on a current rating of a first circuit breaker associated with the first circuit breaker current (e.g., main circuit breaker 108). For example, the determined current rating may be between about 5% to about 95% of a current rating of the first circuit breaker (e.g., main circuit breaker 108). For example, if the current rating of the main circuit breaker 108 is about 200 A, then the determined current rating used by the control circuitry 124 to set the current trip value of the controlled circuit breaker 122 may be about 190 A (about 95% of 200 A). As another example, the control circuitry 124 may be configured to determine the determined current rating based on a current rating of a busbar connected to a first circuit breaker associated with the first circuit breaker current (e.g., busbar 110 connected to main circuit breaker 108). For example, the determined current rating may be between about 5% to about 95% of a current rating of the busbar. For example, if the current rating of busbar 110 is about 240 A, then the current rating used by the control circuitry 124 to set the current trip value may be about 228 A (about 95% of 204 A). In some examples, the current rating may be updated or adjusted (for example, an updated or adjusted current rating for one or more elements of power system 100 may be received or determined by control circuitry 124).

The control circuitry 124 may be configured to determine an available current based on the received sensor data. The control circuitry 124 may be configured to determine an available current by subtracting a measured current value, as indicated via the sensor data, from a current rating (e.g., a determined current rating). For example, if the determined current rating is about 190 A, and the measured current value is about 80 A, then the determined available current may be about 110 A. The current trip value of the controlled circuit breaker 122 may be set according to the determined available current. For example, the current trip value may be set using a percentage of the determined available current (e.g., about 5% to about 95%). For example, 50% of about 110 A is about 55 A. If the measured current value is about 80 A, then the current trip value may be set at about 135 A (about 80 A+about 55 A=about 135 A). The control circuitry 124 may be configured to determine an available power based on the received sensor data. The control circuitry 124 may be configured to determine an available power by subtracting a measured power value, as indicated via the sensor data, from a maximum power rating. The current trip value of the controlled circuit breaker 122 may be set according to the determined available power.

The control circuitry 124 may be configured to change the current trip value based on available current or available power not utilized by a plurality of loads. For example, the plurality of loads may include loads L1, L2, L3 connected to load terminals 112A and/or critical loads CL1, CL2 connected to critical load terminals 146. The control circuitry 124 may be configured to change the current trip value based on a predicted load power. The control circuitry 124 may be configured to determine the predicted load power based on historical data, such as an instantaneous, average, maximum, etc. load power corresponding to a previous time or time period such as a previous day, a previous week, a previous month, etc. The control circuitry 124 may be configured to determine the predicted load power based on a comparison of an instantaneous, average, maximum, etc. load power from a previous time or time period that matches the current time or time period or a future time or time period. The control circuitry 124 may determine the predicted load power using any suitable techniques, including machine learning and/or known techniques. The control circuitry 124 may be configured to change the current trip value based on a load power demand. The control circuitry 124 may be configured to change the current trip value based on the load power demand of the plurality of loads. The control circuitry 124 may be configured to change the current trip value based on a variability of the plurality of loads. The control circuitry 124 may be configured to determine the current trip value based on a total current or a total power of the plurality of loads.

The control circuitry 124 may be configured to change the current trip value based on time data, temperature data, or weather data. The time data, the temperature data, or the weather data may be determined from records of previous time data, previous temperature data, or previous weather data.

Figure 8:
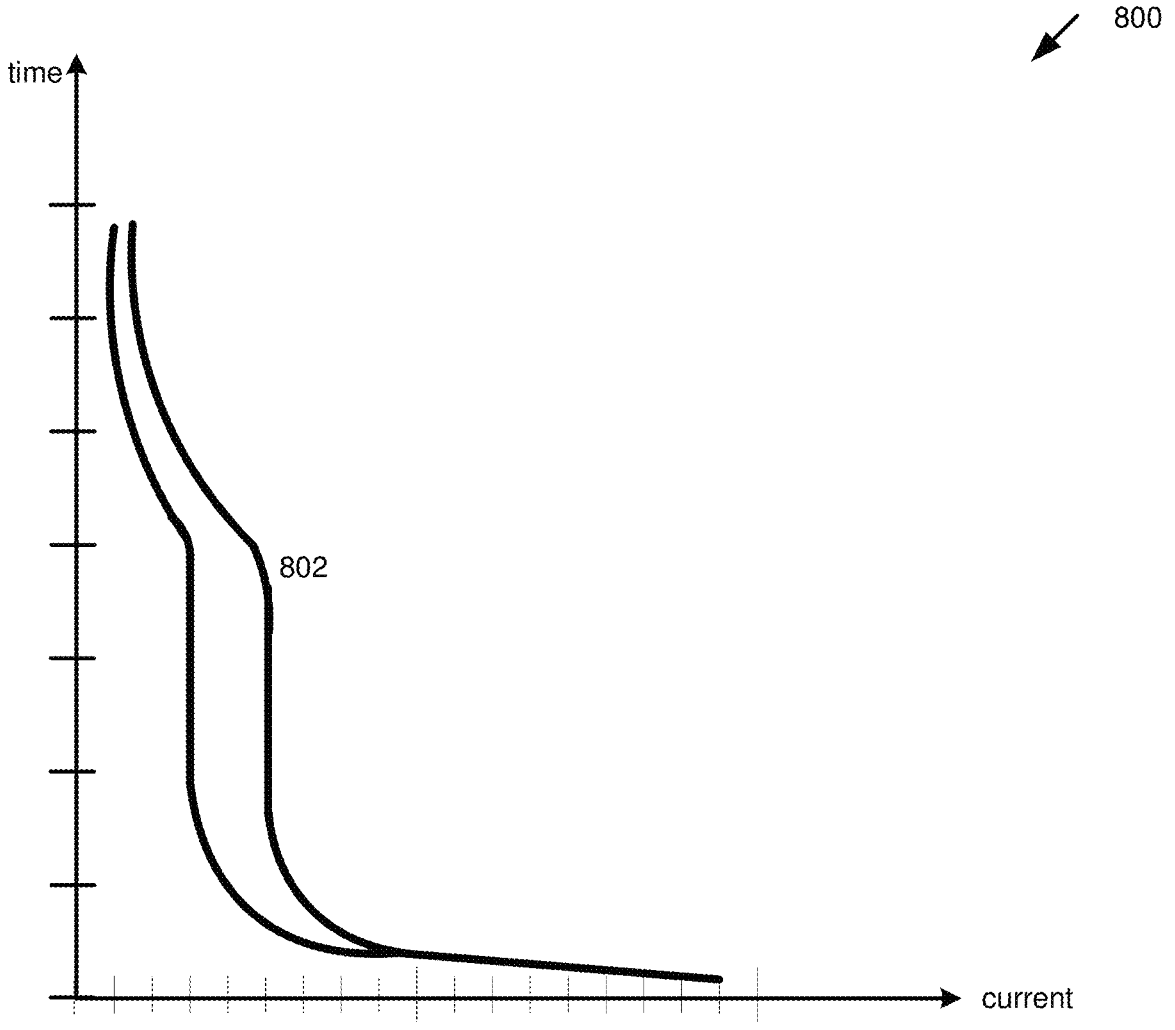
FIG. 8 shows an example graph in accordance with the present disclosure.
Figure 9:
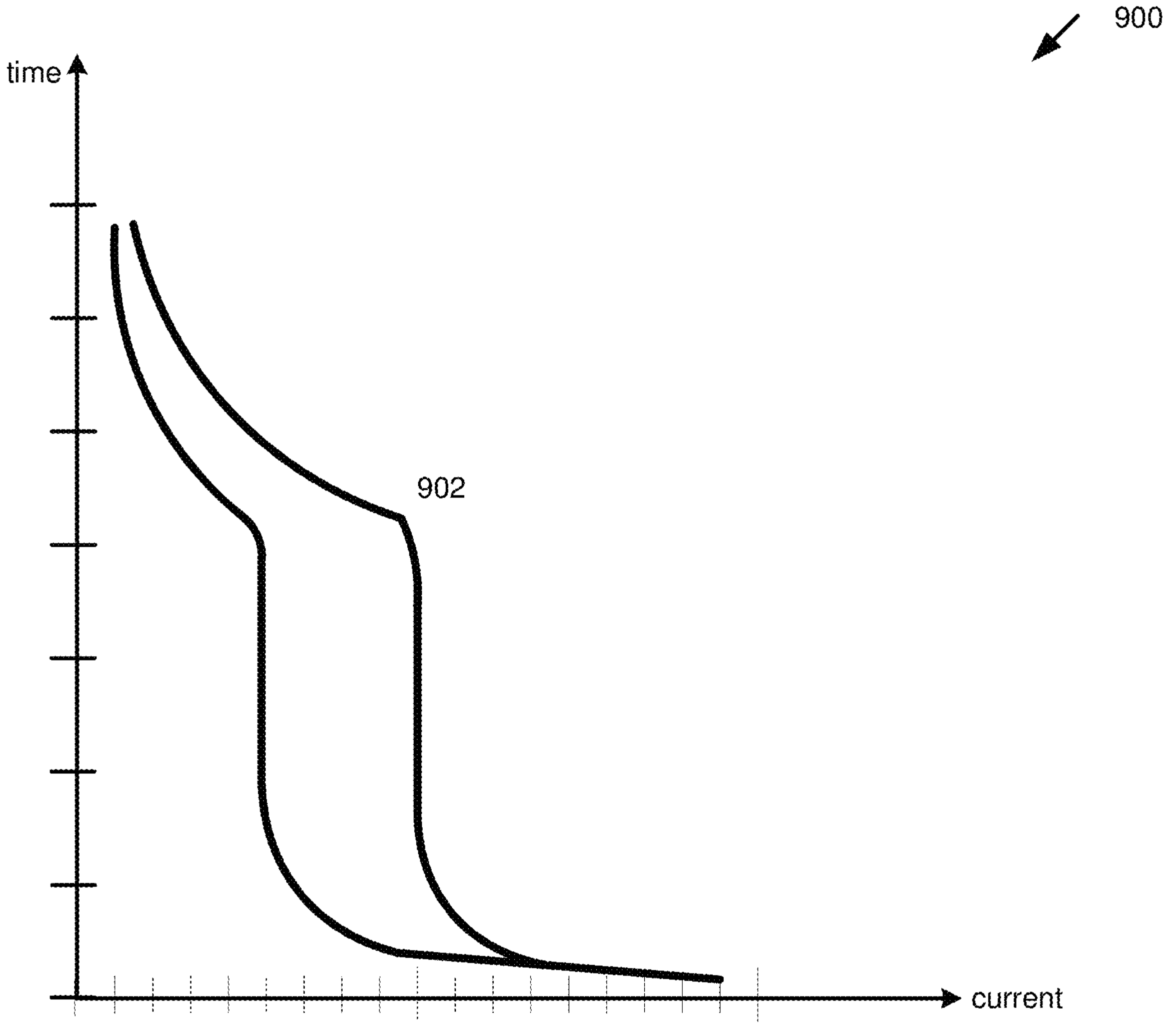
FIG. 9 shows an example graph in accordance with the present disclosure.
Figure 10:
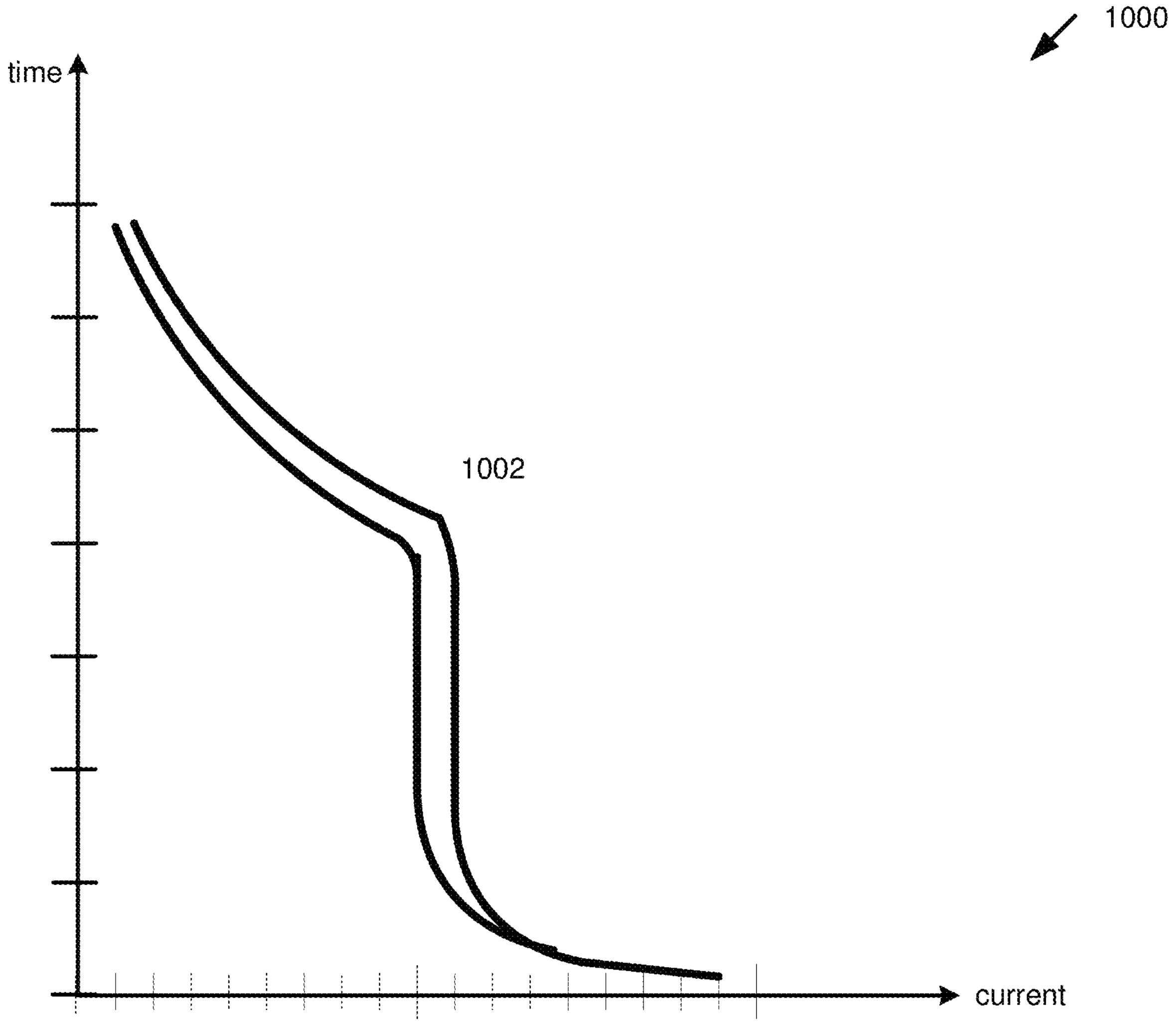
FIG. 10 shows an example graph in accordance with the present disclosure.

The controlled circuit breaker 122 may have a plurality of current trip values. For example, the current trip value may depend on a direction of current (e.g., through the main circuit breaker 108, through the controlled circuit breaker 122, through the primary circuit breaker 142, etc.). For example, the controlled circuit breaker 122 may have two different current trip values, each one associated with a different direction of current. For example, a first current trip value may be associated with current in a first direction through the controlled circuit breaker 122 (e.g., towards the main circuit breaker 108), and a second current trip value may be associated with current in a second direction through the controlled circuit breaker 122 (e.g., from the main circuit breaker 108). Controlled circuit breaker 122 may be configured to adjust one or more of the current trip values of the plurality of current trip values. Controlled circuit breaker 122 may be a bi-directional and asymmetrical circuit breaker. The control circuitry 124 may be configured to, based on the first current rating, set a first current trip value for the second circuit breaker (e.g., the controlled circuit breaker 122 and/or primary circuit breaker 142), and based on the second current rating, set a second further current trip value for the second circuit breaker (e.g., the controlled circuit breaker 122 and/or primary circuit breaker 142). For example, control circuitry 124 may set a first current trip value for controlled circuit breaker 122 based on a current rating of about 40 A (e.g., based on a current rating of about 40 A for load terminals 112A) associated with current in a first direction through the controlled circuit breaker 122 towards the main circuit breaker 108, and set a second current trip value for controlled circuit breaker 122 based on a current rating of about 200 A (e.g., based on a current rating of about 200 A for main circuit breaker 200A and/or busbar 110) associated with current in a second direction through the controlled circuit breaker 122 from the main circuit breaker 108. The first current trip value may be a first threshold or a first range of values, and the second current trip value may be a second threshold or a second range of values. The first range of values may be a first trip curve and the second range of values may be a second trip curve. Examples of trip curves are shown in FIG. 8, FIG. 9, and FIG. 10.

The control circuitry 124 may be configured to, based on a current exceeding the current trip value, open a switching circuitry of the second circuit breaker (e.g., the controlled circuit breaker 122 and/or primary circuit breaker 142), and disconnect the backup interface panel 120 from the busbar 110 of the service panel 102. The control circuitry 124 may be configured to, based on a current being less than the current trip value, increase power provided to the electrical grid 104, or to increase power taken from the electrical grid 104. The control circuitry 124 may be configured to, based on power production of a power source or a level of charge of a power storage, increase power provided to the electrical grid 104, or to increase power taken from the electrical grid 104. The control circuitry 124 may be configured to, based on a first power threshold, increase power provided to the electrical grid 104, and, based on a second power threshold, increase power taken from the electrical grid 104. The control circuitry 124 may be configured to determine a direction of the first circuit breaker current through the main circuit breaker 108. The control circuitry 124 may be configured to control the current trip value based on the direction of the first circuit breaker current (e.g., through the main circuit breaker 108). The current trip value may include a first current trip value identified with the measured first circuit breaker current in a first direction (e.g., from a first circuit breaker such as the main circuit breaker 108 associated with the first circuit breaker current to the backup interface panel 120), and a second current trip value identified with the measured first circuit breaker current in a second direction (e.g., from the backup interface panel 120 to the first circuit breaker such as the main circuit breaker 108). The first current trip value may be greater than the second current trip value. The first current trip value may be based upon the first circuit breaker current in a first direction (e.g., from a first circuit breaker associated with the first circuit breaker such as the main circuit breaker 108 to the backup interface panel 120), and the second further current trip value may be based upon the first circuit breaker current in a second direction (e.g., from the backup interface panel 120 to the main circuit breaker 108). The first current trip value may be greater than the second further current trip value. The control circuitry 124 may be configured to, based on the first current rating, set a first current trip value for the second circuit breaker and, based on the second current rating, set a second further current trip value for the second circuit breaker. The second circuit breaker may have a dynamic current level or a dynamic power level. The control circuitry 124 may be configured to trip the second circuit breaker (e.g., controlled circuit breaker 122, for example, open switch S3) according to the current trip value.

The control circuitry 124 may be configured to provide power to the electrical grid 104 based on a first threshold, and take power from the electrical grid 104 based on a second threshold. The first threshold may be based on a first current rating, and the second threshold may be based on a second current rating. The first threshold may be greater than the second threshold. The control circuitry 124 may be configured to determine the first threshold using the second threshold. The second threshold may be based on a current rating of a circuit breaker associated with the first circuit breaker current (e.g., main circuit breaker 108). The second threshold may be based on a current rating of the busbar (e.g., busbar 110). The control circuitry 124 may be configured to control and adjust the first threshold. The control circuitry 124 may be configured to set a second further current trip value for the second circuit breaker (e.g., controlled circuit breaker 122). The first current trip value may be related to a first time curve and the second further current trip value may be related to a second time curve. The control circuitry 124 may be configured to compute a total current or a total power related to a plurality of loads connected to a first circuit breaker associated with the first circuit breaker current. The control circuitry 124 may be configured to compute the available current based on the computed total current or total power. The control circuitry 124 may be configured to compute a total current or a total power related to a plurality of critical loads connected to the second circuit breaker. The control circuitry 124 may be configured to compute the available current based on the computed total current or total power. The control circuitry 124 may be configured to compute a first total current or a first total power related to a plurality of loads connected to a first circuit breaker associated with the first circuit breaker current. The control circuitry 124 may be configured to compute a second total current or a second total power related to a plurality of critical loads connected to the second circuit breaker, and compute the available current based on: (i) the first computed total current or the first total power, and (ii) the second computed total current or the second total power. The control circuitry 124 may be configured to compute the available current based on a rating of the first circuit breaker.

Controlled circuit breaker 122 is shown located in a housing of backup interface panel 120 by way of example and not limitation. In some examples, controlled circuit breaker 122 may be located external to a housing of backup interface panel 120. For example, controlled circuit breaker 122 may be located external to backup interface panel 120 and between service panel 102 and backup interface panel 120. For example, controlled circuit breaker 122 may be located in a housing of service panel 102.

Having a controlled circuit breaker 122 connected to service panel 102 may prevent the need for a different, non-controlled circuit breaker connected between the service panel 102 and the backup interface panel 120 (e.g., located internal to or external from a housing of one of the panels 102, 120). For example, without controlled circuit breaker 122, a different non-controlled circuit breaker may need to be connected between the service panel 102 and the backup interface panel 120. The different, non-controlled breaker may limit the current to and from the electrical grid to a relatively low current. The different, non-controlled breaker may limit the current in the same manner regardless of the direction of the current (e.g., limit the current regardless of the direction of the current being to or from the electrical grid).

Having a controlled circuit breaker 122 connected to service panel 102 may prevent the need for a dedicated current transformer (CT) loss detection and prevention device, since controlled circuit breaker 122 may perform some or all functions of such a device, and/or preclude the need for such a device. For example, controlled circuit breaker 122 may be controlled to limit current in the direction towards the electrical grid to a relatively low current and/or to allow current in the direction from the electrical grid to a relatively high current, and thus make the need for a dedicated CT loss detection device (e.g., to detect and prevent CT loss from the electrical grid) unnecessary.

Figure 2:
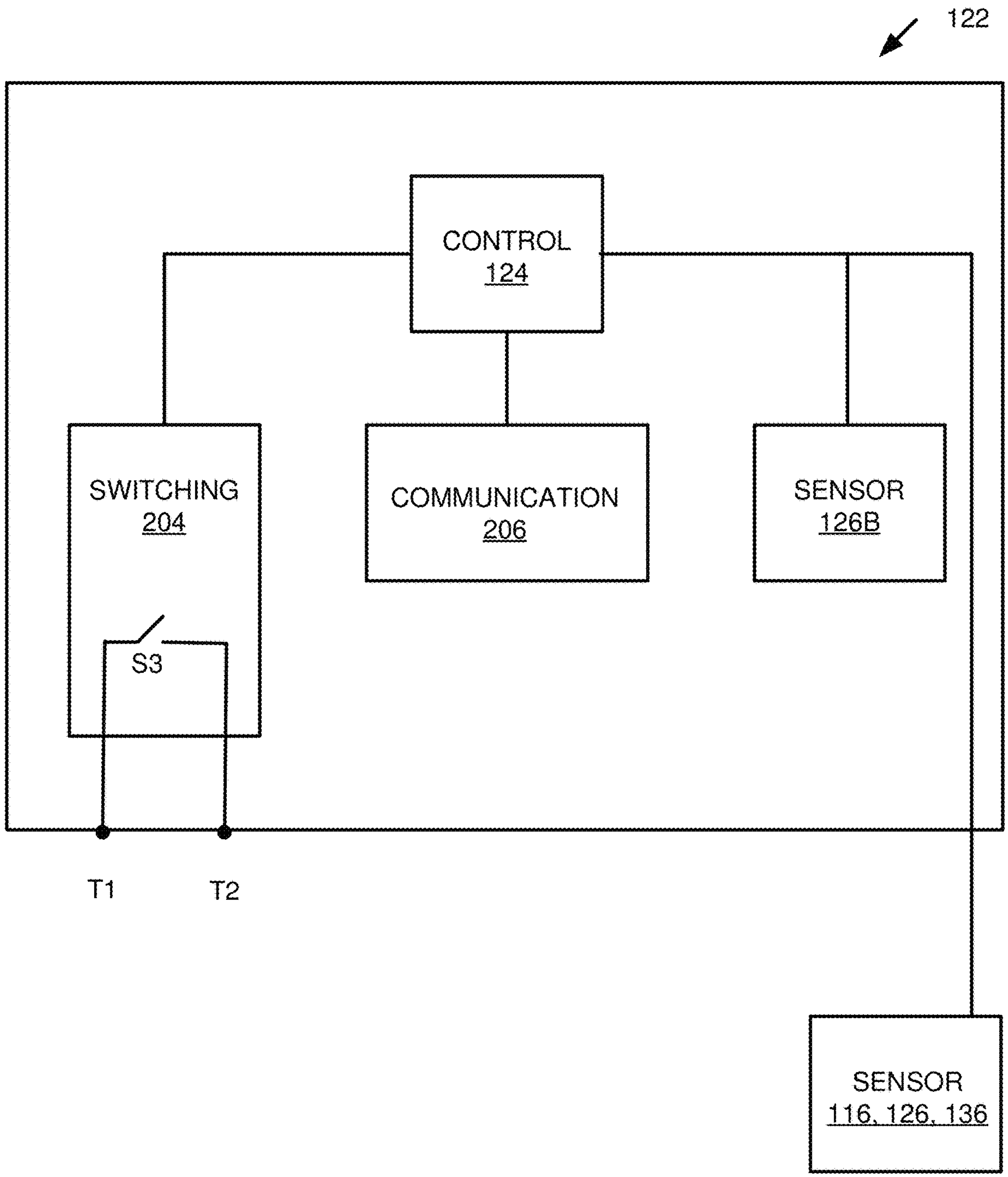
FIG. 2 shows an example circuit breaker in accordance with the present disclosure.

Reference is now made to FIG. 2, which shows an example controlled circuit breaker 122, in accordance with the present disclosure.

Controlled circuit breaker 122 may include control circuitry 124, switching circuitry 204, communication circuitry 206, and sensor 126B. Control circuitry 124 may be connected to one or more sensors that are external to a housing of controlled circuit breaker 122 (for example, any of the sensors 116, 126, 136 of FIG. 1).

Switching circuitry 124 may include any of the switches described above. For example, switching circuitry 124 may include one or more solid state relays (e.g., transistors), and/or one or more electromechanical relays. Control circuitry 124 may be configured to control the operation of the one or more switches of the switching circuitry 124, such as via the generation and/or transmission of suitable control signals for instance.

Communication circuitry 206 may include transmitter circuitry and/or receiver circuitry, as noted above. Transmitter circuitry may be configured to transmit communication signals (e.g., to load communication circuitry, to power source and/or storage 132, to the Internet, to a suitable communication network, to one or more suitable computing devices, etc.). Transmitter circuitry may be configured to transmit communication signals using any suitable number and/or type of wired and/or wireless communication protocols, as discussed above with respect to the control circuitry 124 (e.g., PLC or wireless communications). Receiver circuitry may be configured to receive communication signals from (e.g., from load communication circuitry, from power source and/or storage 132, from the Internet, from a suitable communication network, from one or more suitable computing devices, etc.). Receiver circuitry may be configured to receive communication signals using any suitable number and/or type of wired and/or wireless communication protocols, as discussed above with respect to the control circuitry 124 (e.g., PLC or wireless communications).

Figure 3:
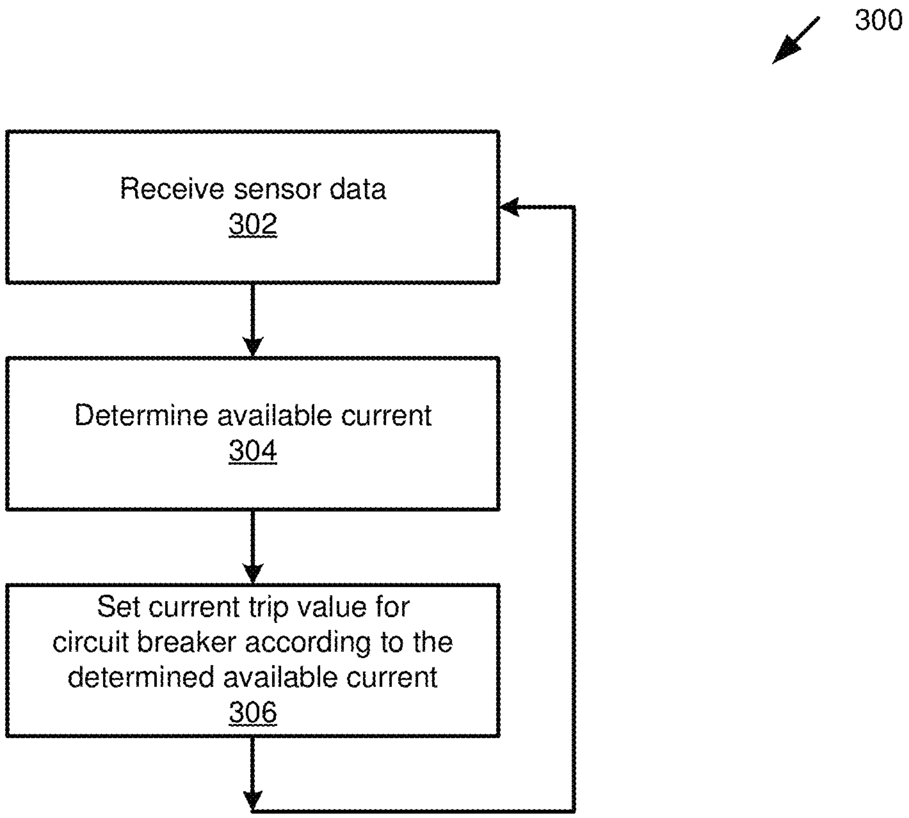
FIG. 3 shows an example flowchart in accordance with the present disclosure.

Reference is now made to FIG. 3, which shows an example method 300 for setting the current trip value of a circuit breaker, in accordance with the present disclosure. Method 300 may be performed by control circuitry 124 or any suitable computing device, processors, etc., which may form part of the power system 100 as discussed herein. For example, control circuitry 124 may include a processor for executing instructions to perform at least some of the steps of method 300.

In step 302, the method 300 comprises receiving sensor data (e.g. via the control circuitry 124). The sensor data may be an electrical parameter measurement (for example, current, voltage, power, etc.). The sensor data may be related to current through a first circuit breaker (e.g., main circuit breaker 108).

In step 304, the method 300 comprises determining (e.g. via the control circuitry 124) an available current. The determination may be made, e.g., using the sensor data (e.g., an electrical parameter measurement of current through the main circuit breaker 108, such as that e.g. received in step 302) and a current rating. The determination may be made, e.g., using a load profile (described in greater detail below).

In step 306, the method 300 comprises setting (e.g. via the control circuitry 124) a current trip value for a circuit breaker (for example, a second circuit breaker, e.g., the controlled circuit breaker 122). The current trip value may be set, for example using the determined available current (e.g. determined in step 304).

After step 306, the method 300 may return to step 302, thereby repeating the method 300.

Figure 4:
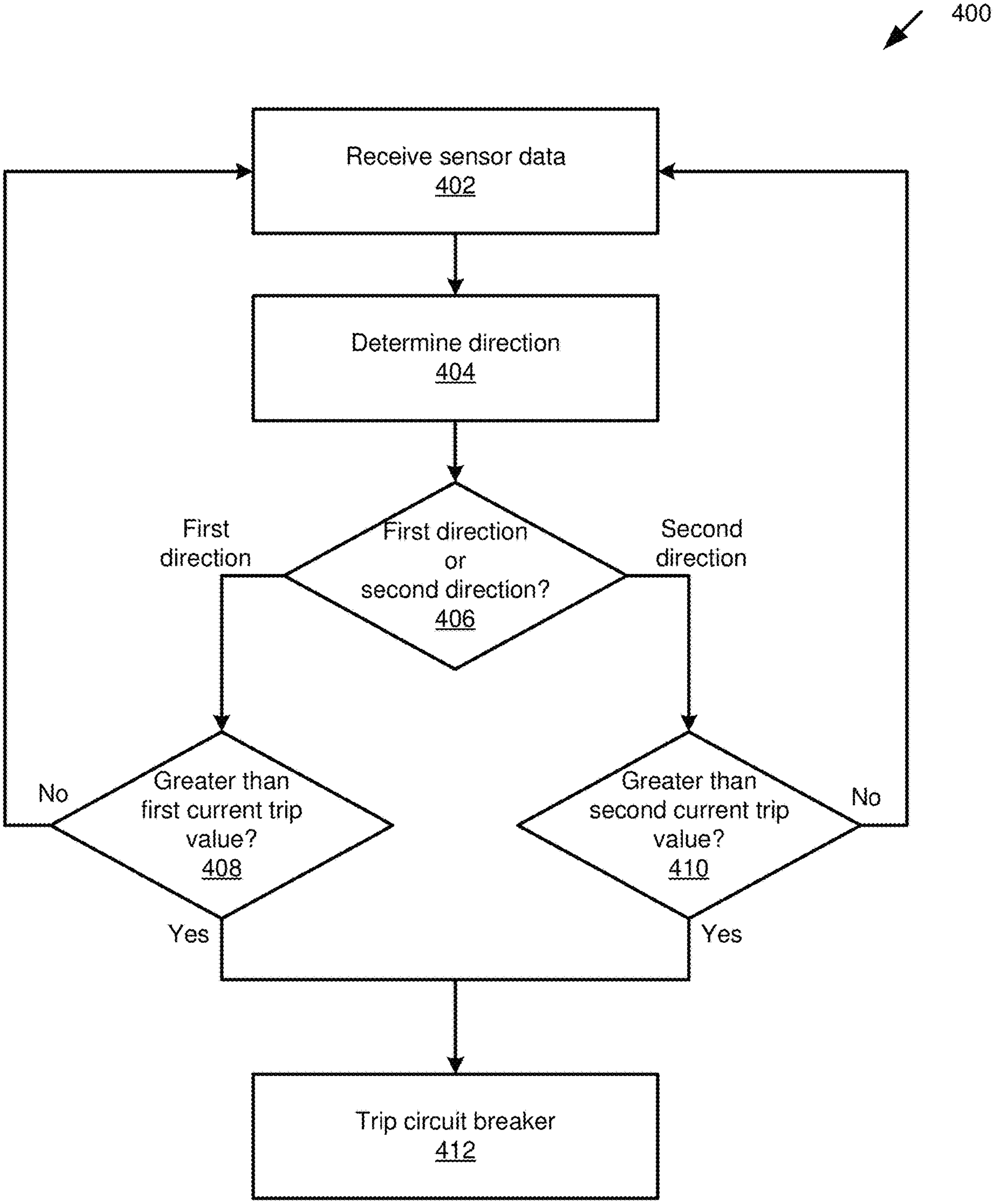
FIG. 4 shows an example flowchart in accordance with the present disclosure.

Reference is now made to FIG. 4, which shows an example method 400 for tripping a circuit breaker, in accordance with the present disclosure. Method 400 may be performed by control circuitry 124 or any suitable computing device, processors, etc., which may form part of the power system 100 as discussed herein. For example, control circuitry 124 may include a processor for executing instructions to perform at least some of the steps of method 400.

In step 402, the method 400 comprises receiving (e.g. via the control circuitry 124) sensor data. The sensor data may be an electrical parameter measurement (for example, current, voltage, power, etc.). The sensor data may be related to current (e.g., through the main circuit breaker 108 and/or through the controlled circuit breaker 122).

In step 404, the method 400 comprises determining (e.g. via the control circuitry 124) a direction of current (e.g., current through the main circuit breaker 108 and/or controlled circuit breaker 122) based on the sensor data (e.g., electrical parameter measurement) (e.g. received in step 402).

In step 406, the method 400 comprises determining (e.g. via the control circuitry 124) whether the direction of the current (e.g. determined in step 404) is a first direction or a second direction. For example, the first direction may be a direction from the electrical grid 104 through the main circuit breaker 108 to the controlled circuit breaker 122. The second direction may be a direction from the controlled circuit breaker 122 through the main circuit breaker 108 to the electrical grid 104. When the direction of the current is determined as the first direction, the method 400 proceeds to step 408. When the direction of the current is determined as the second direction, the method 400 proceeds to step 410.

In step 408, the method 400 comprises determining (e.g. via the control circuitry 124) whether the current which is determined as being in a first direction (e.g. determined in step 406) is greater than a first current trip value (e.g., a first threshold, for example, of the controlled circuit breaker 122). When the current is determined as greater than the first current trip value, the method 400 proceeds to step 412. When the current is determined as less than the first current trip value, the method 400 may return to step 402.

In step 410, the method 400 comprises determining (e.g. via the control circuitry 124) whether the current which is determined as being in a second direction (e.g. determined in step 406) is greater than a second current trip value (e.g., a second threshold, for example, of the controlled circuit breaker 122). When the current is determined as greater than the second current trip value, the method 400 proceeds to step 412. When the current is determined as less than the second current trip value, the method 400 may return to step 402.

In step 412, the method 400 comprises tripping (e.g. via the control circuitry 124) the second breaker (for example, the controlled circuit breaker 122). Control circuitry 124 may be configured to trip the switching circuitry of controlled circuit breaker 122 (for example, to control the switch S3 of controlled circuit breaker 122 into an OFF state to open and break the electrical pathway between terminal T1 and terminal T2).

After step 412, the controlled circuit breaker 122 may need to be reset, which may be performed as a manual or automatic process. For example, the switch S3 may need to be arranged in an ON state to form an electrical pathway between terminal T1 and terminal T2 in order to resume normal operation of the power system 100 (e.g., a non-overcurrent mode of operation) with an electrical pathway between the service panel 102 and the backup interface panel 120 through the controlled circuit breaker 122 (which may be connected to critical loads panel 140 and/or power source and/or storage 132).

Figure 5:
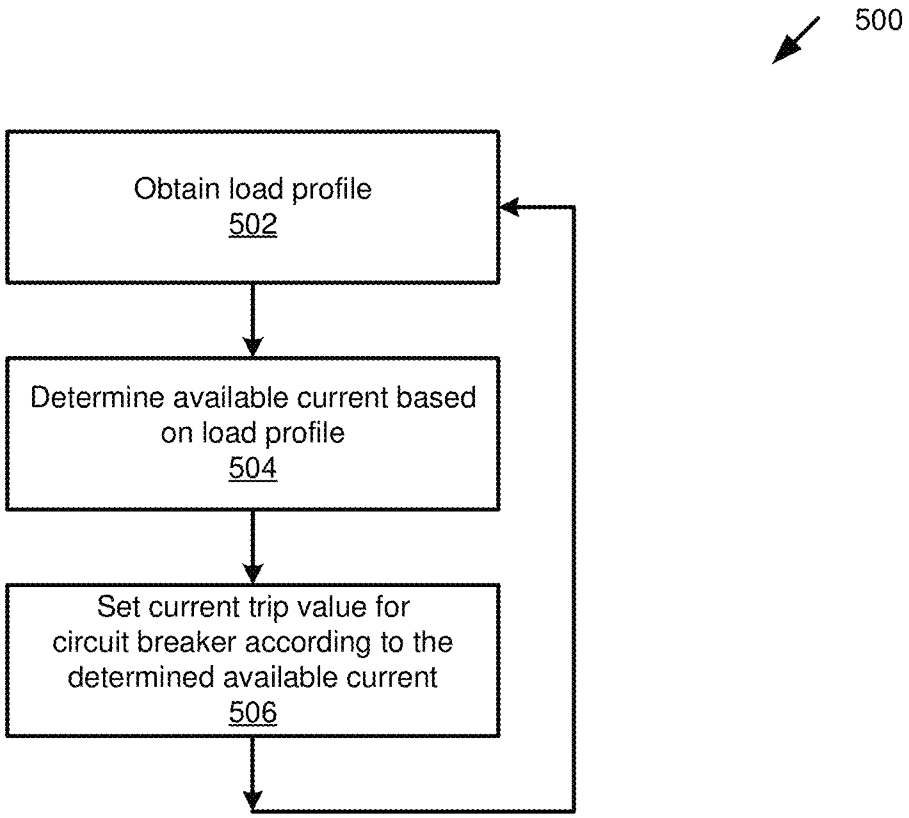
FIG. 5 shows an example flowchart in accordance with the present disclosure.

Reference is now made to FIG. 5 which shows an example method 500 for setting the current trip value of a circuit breaker, in accordance with the present disclosure. Method 500 may be performed by control circuitry 124 or any suitable computing device, processors, etc., which may form part of the power system 100 as discussed herein. For example, control circuitry 124 may include a processor for executing instructions to perform at least some of the steps of method 500.

In step 502, the method 500 comprises obtaining (e.g. via the control circuitry 124) a load profile. The load profile may be a load profile of a non-critical load or a critical load, as discussed above. The load profile may be obtained by receiving and/or determining load profile data.

In step 504, the method 500 comprises determining (e.g. via the control circuitry 124) an available current. The determination of available current may be made using the load profile (e.g., a current level, power level, time of operation, load priority, etc.) (e.g. received in step 502) and a current rating. The determination of available current may additionally or alternatively be made, e.g. using sensor data (described in greater detail above). An expected available current may be determined using the load profile for a time in the future (e.g., later in the day, later in the week, etc.).

In step 506, the method 500 comprises setting (e.g. via control circuitry 124) a current trip value for a circuit breaker (for example, a second circuit breaker, e.g., the controlled circuit breaker 122). The current trip value may be set using the determined available current (e.g. determined in step 504). The current trip value may be set (or a future current trip value may be set) based on an expected available current.

After step 506, the method 500 may return to step 502, thereby repeating the method 500.

In some examples, control circuitry 124 may obtain a plurality of load profiles (e.g., first load profile, second load profile, third load profile, etc.) and determine available current based on the plurality of load profiles. In some examples, control circuitry 124 may obtain an adjusted/updated load profile of a load subsequent to receiving a previous load profile of the load.

Figure 6:
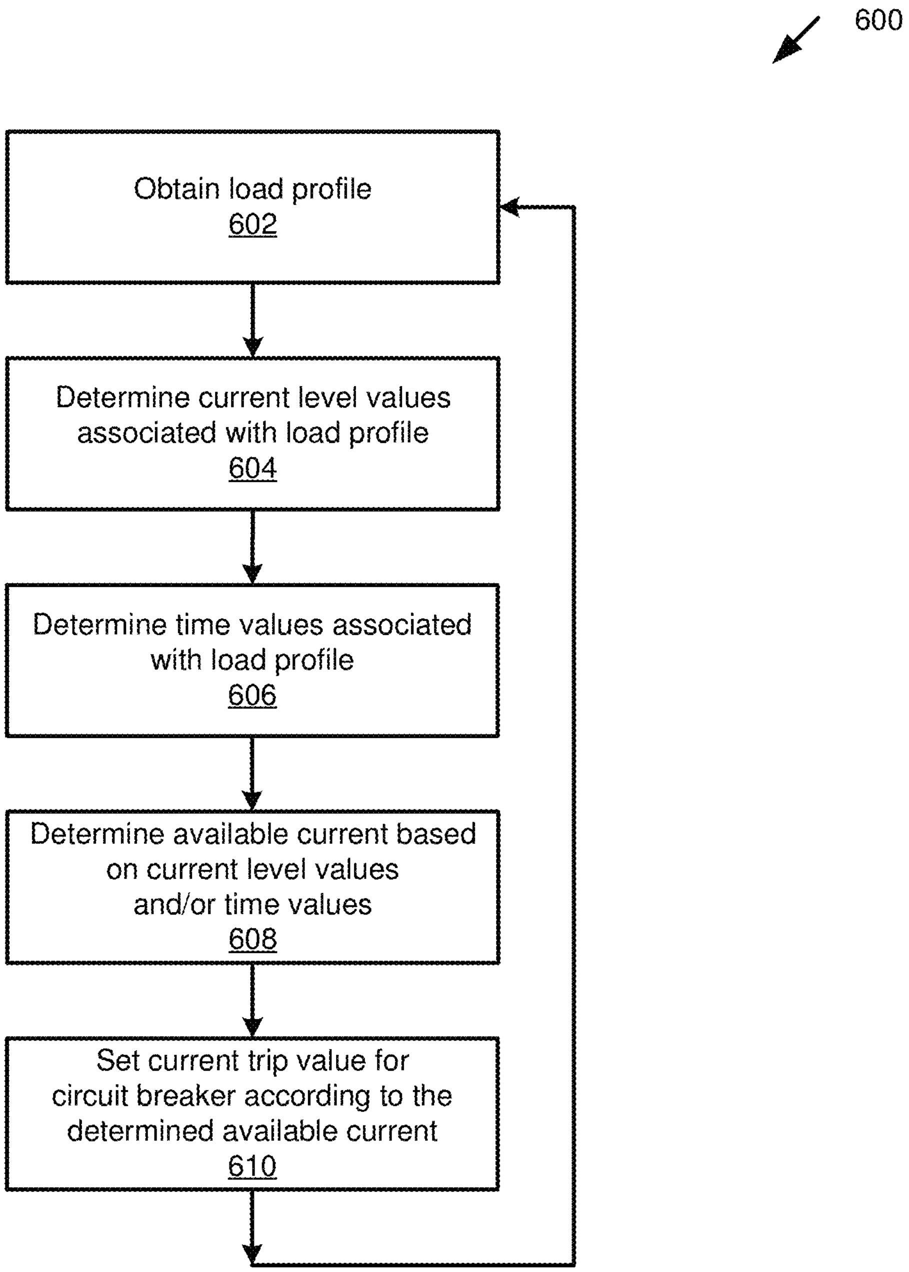
FIG. 6 shows an example flowchart in accordance with the present disclosure.

Reference is now made to FIG. 6, which shows an example method 600 for setting the current trip value of a circuit breaker, in accordance with the present disclosure. Method 600 may be performed by control circuitry 124 or any suitable computing device, processors, etc., which may form part of the power system 100 as discussed herein. For example, control circuitry 124 may include a processor for executing instructions to perform at least some of the steps of method 600.

In step 602, the method 600 comprises obtaining (e.g. via the control circuitry 124) a load profile. The load profile may be a load profile of a non-critical load or a critical load, as noted above. The load profile may be obtained by receiving and/or determining load profile data. In some examples, a plurality of load profiles may be obtained, and in such a case each step of method 600 may be performed in the same manner for each obtained load profile, with the steps of method 600 as shown in FIG. 6 being directed to a single profile for purposes of brevity.

In step 604, the method 600 comprises determining (e.g. via the control circuitry 124) current level values associated with the load profile. The current level values may be determined using the load profile (e.g. obtained in step 602). For example, based on the load profile, a first higher current level (e.g., 40 A) and a second lower current level (e.g., 20 A) may be determined.

In step 606, the method 600 comprises determining (e.g. via the control circuitry 124) time values associated with the load profile. The time values may be determined using the load profile (e.g. obtained in step 602). For example, based on the load profile, a time of day value (for example, a time when the load usually begins drawing power, e.g., 5 pm) may be determined and an amount of time value (for example, an amount of time the load usually draws power, e.g., 7 hours) may be determined.

In step 608, the method 600 comprises determining (e.g. via the control circuitry 124) an available current. The available current may be determined using the current level values (determined in step 604) and/or the time values (determined in step 606). The available current may additionally or alternatively be determined using sensor data (described in greater detail above). An expected available current may be determined using the current level values and/or the time values for a time in the future (e.g., later in the day, later in the week, etc.).

In step 610, the method 600 comprises setting (e.g. via the control circuitry 124) a current trip value for a circuit breaker (for example, a second circuit breaker, e.g., the controlled circuit breaker 122). The current trip value may be set using the determined available current (e.g. determined in step 504). The current trip value may be set (or a future current trip value may be set) based on an expected available current.

After step 610 the method 600 may return to step 602, thereby repeating the method 600.

Figure 7:
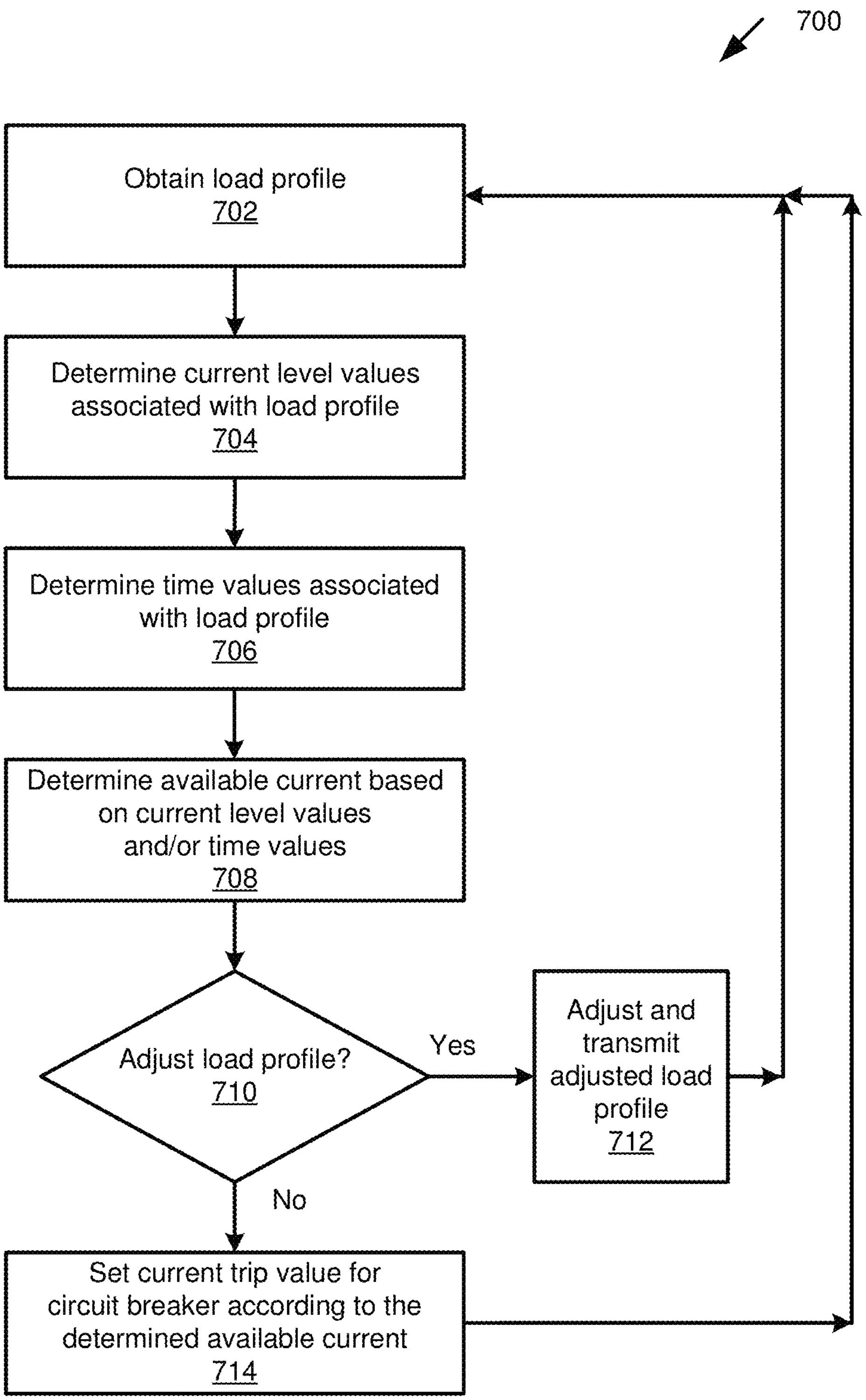
FIG. 7 shows an example flowchart in accordance with the present disclosure.

Reference is now made to FIG. 7 which shows an example method 700 for setting the current trip value of a circuit breaker, in accordance with the present disclosure. Method 700 may be performed by control circuitry 124 or any suitable computing device, processors, etc., which may form part of the power system 100 as discussed herein. For example, control circuitry 124 may include a processor for executing instructions to perform at least some of the steps of method 700.

Steps 702 to 708 may be similar or identical to steps 602 to 608, respectively, of FIG. 6.

In step 710, the method 700 comprises determining (e.g. via the control circuitry 124) whether the load profile should be adjusted (for example, whether the load profile should be updated in computer memory associated with control circuitry 124 and/or the related load). For example, based on the determined available current (determined in step 708), a determination may be made that the load profile should be adjusted. For example, the determined available current may indicate that the load may operate at a higher current level, a lower current level, a greater amount of time, a less amount of time, a higher priority, a lower priority, a different time of day, etc. For example, based on sensor data, the control circuitry 124 may determine that the load profile should be adjusted. For example, the sensor data may indicate that the load may operate at a higher current level, a lower current level, a greater amount of time, a less amount of time, a higher priority, a lower priority, a different time of day, etc. The determination to adjust the load profile may additionally or alternatively be based upon a historical analysis of the sensor data, and/or whether previous trip values for a circuit breaker were frequently exceeded, rarely exceeded, etc., with respect to defined thresholds. Such determinations may be performed via the use of machine learning and/or known techniques. When it is determined that the load profile should be adjusted, the method 700 proceeds to step 712. When it is determined that the load profile should not be adjusted, the method 700 proceeds to step 714.

In step 712, the method 700 comprises adjusting and transmitting (e.g. via the control circuitry 124) the adjusted load profile. Control circuitry 124 may save the adjusted load profile (for example, in computer memory associated with control circuitry 124 and/or the related load). For example, communication circuitry associated with control circuitry 124 may transmit adjusted load profile data to communication circuitry associated with the related load. For example, control circuitry 124 may control the load to adjust the operation of the load based on the adjusted load profile (for example, control the load to operate at a higher current level, a lower current level, a greater amount of time, a less amount of time, a higher priority, a lower priority, a different time of day, etc.). Controlling the load to operate according to the adjusted load profile may help prevent an overcurrent situation, and may help prevent the tripping of controlled circuit breaker 122.

After step 712 the method 700 may return to step 702, thereby repeating the method 700. In step 702 the control circuitry may obtain an adjusted load profile, and proceed to step 704 with the obtained adjusted load profile.

In step 714, the method 700 comprises setting (e.g. via the control circuitry 124) a current trip value for a circuit breaker (for example, a second circuit breaker, e.g., the controlled circuit breaker 122). The current trip value may be set using the determined available current (e.g. determined in step 708). The current trip value may be set (or a future current trip value may be set) based on an expected available current.

After step 714, the method 700 may return to step 702, thereby repeating the method 700.

Again, the load profiles may be used to determine an availability of current, and may be received and/or determined in accordance with any suitable techniques as discussed herein. For instance, the control circuitry 124 may determine the load profiles using the sensor data, which again may be obtained and/or derived via any suitable number and/or type of data sources. For instance, and as noted herein, the sensor data may include the communications received via the critical and non-critical loads, and may additionally or alternatively include data received from other types of data sources such as the Internet, IoT connected devices, etc. The sensor data received by the control circuitry 124 may thus enable the control circuitry 124 to intelligently determine current and future anticipated power resources and/or requirements that allow for a dynamic adaption and allocation between different connected loads.

For example, sensor data received from an IoT device, a sensor 116, or a separate sensor may indicate that a high-current consuming component is not currently in use and that a home is presently occupied. In this scenario, the control circuitry 124 may determine that a set current trip value for one of the circuit breakers (e.g. the main breaker 108) may be reduced, whereas the set current trip value for another circuit breaker (e.g. the primary circuit breaker 142) may be increased. In this way, the control circuitry 124 may dynamically adjust the current trip values between one or more of the main circuitry breaker 108, the controlled circuit breaker 122, and/or the primary circuit breaker 142 based upon dynamically changing power needs within the power system 100. As another example, the control circuitry 124 may instruct (e.g. via suitable data communications) a non-critical and/or non-critical load to adjust a run time, e.g. to run for a longer period of time at a lower power consumption level, thereby leaving additional "headroom" for other devices (e.g. other non-critical and/or critical loads) to operate. In this way, the power system 100, as well as the various functions thereof as discussed herein, functions to effectively divert available power from currently unused or lesser used loads (or loads anticipated to use less current in the future) to other loads that are currently consuming higher current (or anticipated to consume a higher current in the future).

The current trip value may be a threshold value or a range of values. The range of values may be identified with a trip curve. Examples of trip curves are shown in FIG. 8, FIG. 9, and FIG. 10. For example, the controlled circuit breaker 122 may be controlled to have a trip curve 802 as shown in FIG. 8, a trip curve 902 as shown in FIG. 9, or a trip curve 1002 as shown in FIG. 10, etc. Which trip curve is set for the controlled circuit breaker 122 by the control circuitry 124 may depend on dynamically calculated values. Which trip curve is set for the controlled circuit breaker 122 by the control circuitry 124 may depend on a direction of the current. For example, a first trip curve 802 may be set for the controlled circuit breaker 122 for a first direction (e.g., to or from an electrical grid), and a second trip curve 1002 may be set for the controlled circuit breaker 122 for a second direction (e.g., from or to the electrical grid). For example, a first trip curve 802 may be set for the controlled circuit breaker 122 based on a first one or more loads connected to the controlled circuit breaker 122, and a second trip curve 902 may be set for the controlled circuit breaker 122 based on a second one or more loads connected to the controlled circuit breaker 122. For example, the trip curve 802 may be set to trip based on an instantaneous tripping current of about 3 to about 5 times a rated current value IN. The trip curve 902 may be set to trip based on an instantaneous tripping current of about 5 to about 10 times a rated current value IN. The trip curve 1002 may be set to trip based on an instantaneous tripping current of about 10 to about 20 times a rated current value IN, etc. For example, for a rated current of about 10 A, the instantaneous tripping current of trip curve 802 may be about 30 A to about 50 A, the instantaneous tripping current of trip curve 902 may be about 50 A to about 100 A, the instantaneous tripping current of trip curve 802 may be about 100 A to about 200 A, etc. For example, control circuitry 124 may be configured to control and set the rated current value IN. For example, control circuitry may control and change the rated current value IN of the controlled circuit breaker 122 based on dynamically calculated values and/or a direction of the current. For example, control circuitry 124 may control the rated current value IN to be tens or hundreds of amperes depending on the configuration for a given situation. The trip curves 802, 902, 1002 are given as examples, and other trip curves are possible.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

Following are clauses of the disclosure:

Clauses

1. An apparatus, comprising:
   a sensor configured to measure a first circuit breaker current;
   a second circuit breaker; and
   control circuitry configured to:
      receive, from the sensor, sensor data that is based upon the measured first circuit breaker current;
      determine an available current based on the sensor data and a current rating; and
      set a current trip value for the second circuit breaker based on the determined available current.
2. The apparatus of clause 1, wherein the control circuitry is configured to receive the sensor data from the sensor via wireless communications.
3. The apparatus of clause 1 or clause 2, wherein the control circuitry is configured to receive the sensor data from the sensor via power line communication (PLC).
4. The apparatus of any of clauses 1-3, wherein the sensor data is indicative of an electrical parameter measurement.
5. The apparatus of any of clauses 1-4, wherein the electrical parameter measurement comprises current, voltage, or power.
6. The apparatus of any of clauses 1-5, wherein the sensor is incorporated into a utility meter, a first circuit breaker associated with the first circuit breaker current, or a busbar.
7. The apparatus of any of clauses 1-6, wherein the sensor is connected between a utility meter and a first circuit breaker associated with the first circuit breaker current, between the utility meter and a busbar, or between the first circuit breaker and the busbar.
8. The apparatus of any of clauses 1-7, wherein a first circuit breaker associated with the first circuit breaker current comprises the sensor.
9. The apparatus of any of clauses 1-8, wherein a first circuit breaker associated with the first circuit breaker current comprises switching circuitry.
10. The apparatus of any of clauses 1-9, wherein a first circuit breaker associated with the first circuit breaker current is coupled to a service panel.
11. The apparatus of any of clauses 1-10, wherein the service panel is coupled to an electrical grid.
12. The apparatus of any of clauses 1-11, wherein the control circuitry is configured to determine an available power based on the received sensor data.
13. The apparatus of any of clauses 1-12, wherein the control circuitry is configured to determine an available power by subtracting a measured power value, as indicated via the sensor data, from a maximum power rating.
14. The apparatus of any of clauses 1-13, wherein the control circuitry is configured to determine the current rating based on a current rating of a first circuit breaker associated with the first circuit breaker current.
15. The apparatus of any of clauses 1-14, wherein the current rating is between 50% to 90% of a current rating of the first circuit breaker.
16. The apparatus of any of clauses 1-15, wherein the control circuitry is configured to determine the current rating based on a current rating of a busbar connected to a first circuit breaker associated with the first circuit breaker current.
17. The apparatus of any of clauses 1-16, wherein the current rating is between 50% to 90% of a current rating of the busbar.
18. The apparatus of any of clauses 1-17, wherein the control circuitry is configured to change the current trip value based on available power not utilized by a plurality of loads.
19. The apparatus of any of clauses 1-18, wherein the control circuitry is configured to change the current trip value based on a predicted load power.
20. The apparatus of any of clauses 1-19, wherein the control circuitry is configured to determine the predicted load power based on historical data.
21. The apparatus of any of clauses 1-20, wherein the control circuitry is configured to change the current trip value based on a load power demand.
22. The apparatus of any of clauses 1-21, wherein the control circuitry is configured to change the current trip value based on the load power demand of a plurality of loads.
23. The apparatus of any of clauses 1-22, wherein the control circuitry is configured to change the current trip value based on a variability of the plurality of loads.
24. The apparatus of any of clauses 1-23, wherein the control circuitry is configured to determine the current trip value based on a total current or a total power of the plurality of loads.
25. The apparatus of any of clauses 1-24, wherein the control circuitry is configured to change the current trip value based on time data, temperature data, or weather data.
26. The apparatus of any of clauses 1-25, wherein the time data, the temperature data, or the weather data are determined from records of previous time data, previous temperature data, or previous weather data.
27. The apparatus of any of clauses 1-26, wherein the second circuit breaker is incorporated into a backup interface panel.
28. The apparatus of any of clauses 1-27, further comprising:
   a busbar,
   wherein each of a first circuit breaker associated with the first circuit breaker current and the backup interface panel are coupled to the busbar.
29. The apparatus of any of clauses 1-28, wherein the control circuitry is configured to, based on a current exceeding the current trip value:
   open a switching circuitry of the second circuit breaker, and
   disconnect the backup interface panel from the busbar.
30. The apparatus of any of clauses 1-29, wherein the control circuitry is configured to, based on a current being less than the current trip value:
   increase power provided to the electrical grid, or
   increase power taken from the electrical grid.
31. The apparatus of any of clauses 1-30, wherein the control circuitry is configured to, based on power production of a power source or a level of charge of a power storage:
   increase power provided to the electrical grid, or
   increase power taken from the electrical grid.
32. The apparatus of any of clauses 1-31, wherein the control circuitry is configured to:

based on a first power threshold, increase power provided to the electrical grid, and based on a second power threshold, increase power taken from the electrical grid.

33. The apparatus of any of clauses 1-32, wherein the control circuitry is configured to determine a direction of the first circuit breaker current.

34. The apparatus of any of clauses 1-33, wherein the control circuitry is configured to control the current trip value based on the direction of the first circuit breaker current.

35. The apparatus of any of clauses 1-34, wherein the current trip value comprises a first current trip value identified with the measured first circuit breaker current in a first direction from a first circuit breaker associated with the first circuit breaker current to a backup interface panel, and a second current trip value identified with the measured first circuit breaker current in a second direction from the backup interface panel to the first circuit breaker.

36. The apparatus of any of clauses 1-35, wherein the first current trip value is greater than the second current trip value.

37. The apparatus of any of clauses 1-36, wherein the busbar further comprises:

a load terminal; and a circuit breaker terminal, and wherein:

each of a first circuit breaker associated with the first circuit breaker current, the busbar, and the circuit breaker terminal is rated for a first current rating, the load terminal is rated for a second current rating, and the first current rating is greater than the second current rating.

38. The apparatus of any of clauses 1-37, further comprising:

load switching circuitry, wherein the load switching circuitry is coupled to the load terminal.

39. The apparatus of any of clauses 1-38, wherein the control circuitry is configured to:

based on the first current rating, set the current trip value for the second circuit breaker, and based on the second current rating, set a further current trip value for the second circuit breaker.

40. The apparatus of any of clauses 1-39, wherein the current trip value is based upon the first circuit breaker current in a first direction from a first circuit breaker associated with the first circuit breaker to the backup interface panel, and the further current trip value is based upon the first circuit breaker current in a second direction from the backup interface panel to the first circuit breaker.

41. The apparatus of any of clauses 1-40, wherein the current trip value is greater than the further current trip value.

42. The apparatus of any of clauses 1-41, wherein the backup interface panel is configured to be coupled to a power source.

43. The apparatus of any of clauses 1-42, wherein the power source is a photovoltaic (PV) power source.

44. The apparatus of any of clauses 1-43, further comprising:

a power storage coupled to the second circuit breaker.

45. The apparatus of any of clauses 1-44, wherein the power storage is a battery.

46. The apparatus of any of clauses 1-45, wherein the battery is part of an electric vehicle.

47. The apparatus of any combination of clauses 1-46, further comprising:

a backup generator coupled to the second circuit breaker.

48. The apparatus of any of clauses 1-47, further comprising:

a critical loads panel coupled to the second circuit breaker.

49. The apparatus of any of clauses 1-48, further comprising:

balancing circuitry coupled to the second circuit breaker.

50. The apparatus of any of clauses 1-49, wherein the balancing circuitry is configured to perform phase balancing.

51. The apparatus of any of clauses 1-50, wherein the balancing circuitry is configured to perform power factor correction (PFC).

52. The apparatus of any of clauses 1-51, wherein the current rating is a maximum current rating.

53. A method comprising:

receiving sensor data that is based upon a measured first circuit breaker current;

computing an available current based on the sensor data and a current rating; and setting a current trip value for a second circuit breaker based upon the computed available current.

54. The method of clause 53, wherein the second circuit breaker has a dynamic current level or a dynamic power level.

55. The method of clause 53 or clause 54, further comprising:

tripping the second circuit breaker according to the current trip value.

56. The method of any of clauses 53-55, wherein a first circuit breaker associated with the first circuit breaker current is coupled to an electrical grid via a busbar, the method further comprising:

providing power to the electrical grid based on a first threshold; and taking power from the electrical grid based on a second threshold.

57. The method of any of clauses 53-56, wherein the first threshold is greater than the second threshold.

58. The method of any of clauses 53-57, further comprising:

determining the first threshold using the second threshold.

59. The method of any of clauses 53-58, wherein the second threshold is based on a current rating of a first circuit breaker associated with the first circuit breaker current.

60. The method of any of clauses 53-59, wherein the second threshold is based on a current rating of the busbar.

61. The method of any of clauses 53-60, further comprising:

adjusting the first threshold.

62. The method of any of clauses 53-61, further comprising:

setting a further current trip value for the second circuit breaker.

63. The method of any of clauses 53-62, wherein the current trip value is related to a first time curve and the further current trip value is related to a second time curve.
64. The method of any of clauses 53-63, further comprising:
   computing a total current or a total power related to a plurality of loads connected to a first circuit breaker associated with the first circuit breaker current; and
   computing the available current based on the computed total current or total power.
65. The method of any of clauses 53-64, further comprising:
   computing a total current or a total power related to a plurality of critical loads connected to the second circuit breaker; and
   computing the available current based on the computed total current or total power.
66. The method of any of clauses 53-65, further comprising:
   computing a first total current or a first total power related to a plurality of loads connected to a first circuit breaker associated with the first circuit breaker current;
   computing a second total current or a second total power related to a plurality of critical loads connected to the second circuit breaker; and
   computing the available current based on:
      (i) the first computed total current or the first total power, and
      (ii) the second computed total current or the second total power.
67. The method of any of clauses 53-66, further comprising:
   computing the available current based on a rating of the first circuit breaker.
68. The method of any of clauses 53-67, further comprising:
   balancing phase differences related to the second circuit breaker.
69. The method of any of clauses 53-68, further comprising:
   performing power factor correction (PFC) related to the second circuit breaker.
70. The method of any of clauses 53-69, further comprising:
   generating, using a power source connected to the second circuit breaker, a current flowing through a first circuit breaker associated with the first circuit breaker current.
71. The method of any of clauses 53-70, further comprising:
   storing, using a power storage, power associated with a current flowing through a first circuit breaker associated with the first circuit breaker current.
72. The method of any of clauses 53-71, wherein the power storage is a battery, and wherein the battery is part of an electric vehicle.
73. An apparatus comprising:
   a switch configured to be coupled between a service panel and a backup interface panel;
   a sensor configured to:
      measure a first current or a first power in a first direction from the service panel to the backup interface panel via the switch, and
      measure a second current or a second power in a second direction from the backup interface panel to the service panel via the switch; and
   circuitry configured to:
      compare the first current or the first power to a first threshold;
      compare the second current or the second power to a second threshold; and
      control the switch to disconnect the service panel from the backup interface panel by opening the switch, based on:
         (i) the first current or the first power being greater than the first threshold, or
         (ii) the second current or the second power being greater than the second threshold,
      wherein the first threshold is different than the second threshold.
74. The apparatus of clause 73, wherein the first threshold is greater than the second threshold.
75. The apparatus of clause 73 or clause 74, wherein the sensor comprises a first sensor configured to measure the first current and a second sensor configured to measure the second current, and
   wherein the first sensor and the second sensor are integrated into a common sensor package, which is configured to determine a direction of current or power.
76. The apparatus of any of clauses 73-75, wherein the switch is an electromechanical switch.
77. The apparatus of any of clauses 73-76, wherein the switch is a solid state switch.
78. The apparatus of any of clauses 73-77, wherein the switch is from among a plurality of switches.
79. The apparatus of any of clauses 73-78, wherein the first threshold is determined based on a rating of a busbar of the service panel.
80. The apparatus of any of clauses 73-79, wherein the second threshold is determined based on a rating of a circuit breaker of the service panel.
81. A method comprising:
   determining a first electrical parameter measurement in a first direction from a service panel to a backup interface panel;
   comparing the first electrical parameter measurement to a first threshold;
   determining a second electrical parameter measurement in a second direction from the backup interface panel to the service panel;
   comparing the second electrical parameter measurement to a second threshold; and
   disconnecting the service panel from the backup interface panel based on:
      (i) the first electrical parameter measurement being greater than the first threshold, or
      (ii) the second electrical parameter measurement being greater than the second threshold,
   wherein the first threshold is different than the second threshold.
82. The method of clause 81, wherein the first threshold is greater than the second threshold.
83. The method of clause 81 or clause 82, further comprising:
   determining a direction of the electrical parameter measurement.
84. The method of any of clauses 81-83, further comprising:

determining an available current based upon (i) a calculation of a total current based on a plurality of sensed currents related to a first plurality of loads connected to the service panel and a second plurality of loads connected to a critical loads panel coupled to the backup interface panel, (ii) the first threshold, and/or (iii) the second threshold.

85. The method of any of clauses 81-84, further comprising:

determining an available power based upon a calculation of (i) a total power based on a plurality of sensed powers related to a first plurality of loads connected to the service panel and a second plurality of loads connected to a critical loads panel coupled to the backup interface panel, (ii) the first threshold, and/or (iii) the second threshold.

86. The method of any of clauses 81-85, further comprising:

controlling a current or a power to be below a third threshold, wherein the third threshold is less than the first threshold.

87. The method of any of clauses 81-86, further comprising:

setting a first trip value based on the first threshold; and setting a second trip value based on the second threshold.

88. The method of any of clauses 81-87, further comprising:

controlling an adjustment of the first threshold.

89. The method of any of clauses 81-88, further comprising:

controlling an adjustment of the first trip value or controlling an adjustment of the second trip value.

90. The method of any of clauses 81-89, wherein the first electrical parameter measurement is indicative of a first current or a first power, and wherein the second electrical parameter measurement is indicative of a second current or a second power.

The invention claimed is:

1. An apparatus, comprising:

a sensor configured to measure a first circuit breaker current;

a second circuit breaker; and control circuitry configured to:

receive, from the sensor, sensor data that is based upon the measured first circuit breaker current;

determine an available current based on the sensor data and a current rating;

determine an available power by subtracting a measured power value, as indicated via the sensor data, from a maximum power rating; and set a current trip value for the second circuit breaker based on the determined available current.

2. The apparatus of claim 1, wherein the sensor data is indicative of an electrical parameter measurement.

3. The apparatus of claim 2, wherein the electrical parameter measurement comprises current, voltage, or power.

4. The apparatus of claim 1, wherein the sensor is incorporated into a utility meter, a first circuit breaker associated with the first circuit breaker current, or a busbar.

5. The apparatus of claim 1, wherein the sensor is connected between a utility meter and a first circuit breaker associated with the first circuit breaker current, between the utility meter and a busbar, or between the first circuit breaker and the busbar.

6. The apparatus of claim 1, wherein a first circuit breaker associated with the first circuit breaker current comprises the sensor.

7. The apparatus of claim 1, wherein a first circuit breaker associated with the first circuit breaker current comprises switching circuitry.

8. The apparatus of claim 1, wherein a first circuit breaker associated with the first circuit breaker current is coupled to a service panel.

9. The apparatus of claim 8, wherein the service panel is coupled to an electrical grid.

10. The apparatus of claim 1, wherein the control circuitry is configured to determine a direction of the first circuit breaker current based on the determined available.

11. The apparatus of claim 1, wherein the control circuitry is configured to set the current trip value for the second circuit breaker based on the determined-aa available power.

12. The apparatus of claim 1, wherein the control circuitry is configured to determine the current rating based on a current rating of a first circuit breaker associated with the first circuit breaker current.

13. The apparatus of claim 12, wherein the current rating is between 50% to 90% of a current rating of the first circuit breaker.

14. The apparatus of claim 1, wherein the control circuitry is configured to determine the current rating based on a current rating of a busbar connected to a first circuit breaker associated with the first circuit breaker current.

15. The apparatus of claim 14, wherein the current rating is between 50% to 90% of a current rating of the busbar.

16. The apparatus of claim 1, wherein the control circuitry is configured to change the current trip value based on a predicted load power.

17. The apparatus of claim 16, wherein the control circuitry is configured to determine the predicted load power based on historical data.

18. The apparatus of claim 1, wherein the control circuitry is configured to change the current trip value based on a load power demand.

19. The apparatus of claim 1, wherein the control circuitry is configured to change the current trip value based on time data, temperature data, or weather data.

20. A method, comprising:

measuring, using a sensor, a first circuit breaker current;

receiving from the sensor, using control circuitry, sensor data that is based upon the measured first circuit breaker current;

determining, using the control circuitry, an available current based on the sensor data and a current rating;

determining, using the control circuitry, an available power by subtracting a measured power value, as indicated via the sensor data, from a maximum power rating; and setting, using the control circuitry, a current trip value for a second circuit breaker based on the determined available current.

* * * * *